(12) United States Patent
Kawabe et al.

(10) Patent No.: US 7,317,388 B2
(45) Date of Patent: Jan. 8, 2008

(54) POSITION DETECTION SYSTEM FOR MOBILE OBJECT

(75) Inventors: Koji Kawabe, Saitama (JP); Satoki Matsumoto, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 219 days.

(21) Appl. No.: 11/092,585

(22) Filed: Mar. 29, 2005

(65) Prior Publication Data

US 2005/0218292 A1   Oct. 6, 2005

(30) Foreign Application Priority Data

Mar. 31, 2004 (JP) ............................. 2004-102655
Mar. 31, 2004 (JP) ............................. 2004-104174

(51) Int. Cl.
*G08B 1/08* (2006.01)
(52) U.S. Cl. .................. 340/539.13; 340/539.1; 340/539.23; 340/572.1; 340/825.36; 340/825.49; 340/825.69; 205/206; 700/245; 700/259
(58) Field of Classification Search ............ 340/539.1, 340/539.13, 539.23, 572.1, 572.3, 572.4, 340/825.36, 825.49, 825.69; 235/487, 492; 250/206, 221, 341.6; 342/47, 53; 700/245, 700/259
See application file for complete search history.

(56) References Cited

U.S. PATENT DOCUMENTS

| 5,446,445 A | * | 8/1995 | Bloomfield et al. | ........ 340/521 |
| 6,452,504 B1 | * | 9/2002 | Seal | ........ 340/825.49 |
| 6,703,935 B1 | * | 3/2004 | Chung et al. | ........ 340/572.7 |
| 2005/0054332 A1 | * | 3/2005 | Sakagami et al. | |

FOREIGN PATENT DOCUMENTS

| JP | 2002-098749 | 4/2002 |
| JP | 2002-307338 | 10/2002 |
| JP | 2003-091678 | 3/2003 |

* cited by examiner

*Primary Examiner*—Hung Nguyen
(74) *Attorney, Agent, or Firm*—Squire, Sanders & Dempsey L.L.P.

(57) ABSTRACT

A position detection system for measuring a position of a mobile object traveling throughout a controlled area, the position detection system includes a tag, which is provided on the mobile object, a detector, which obtains object position information which indicates the position of the mobile object, object position information includes direction information and distance information relative to the detector of the mobile object, and the detector travels throughout the controlled area, and a base station which obtains detector position information which indicates the position of the detector, detector position information includes an absolute position and angle within the controlled area of the detector, in order to measure the position within the controlled area of the mobile object based on object position information and detector position information.

16 Claims, 26 Drawing Sheets

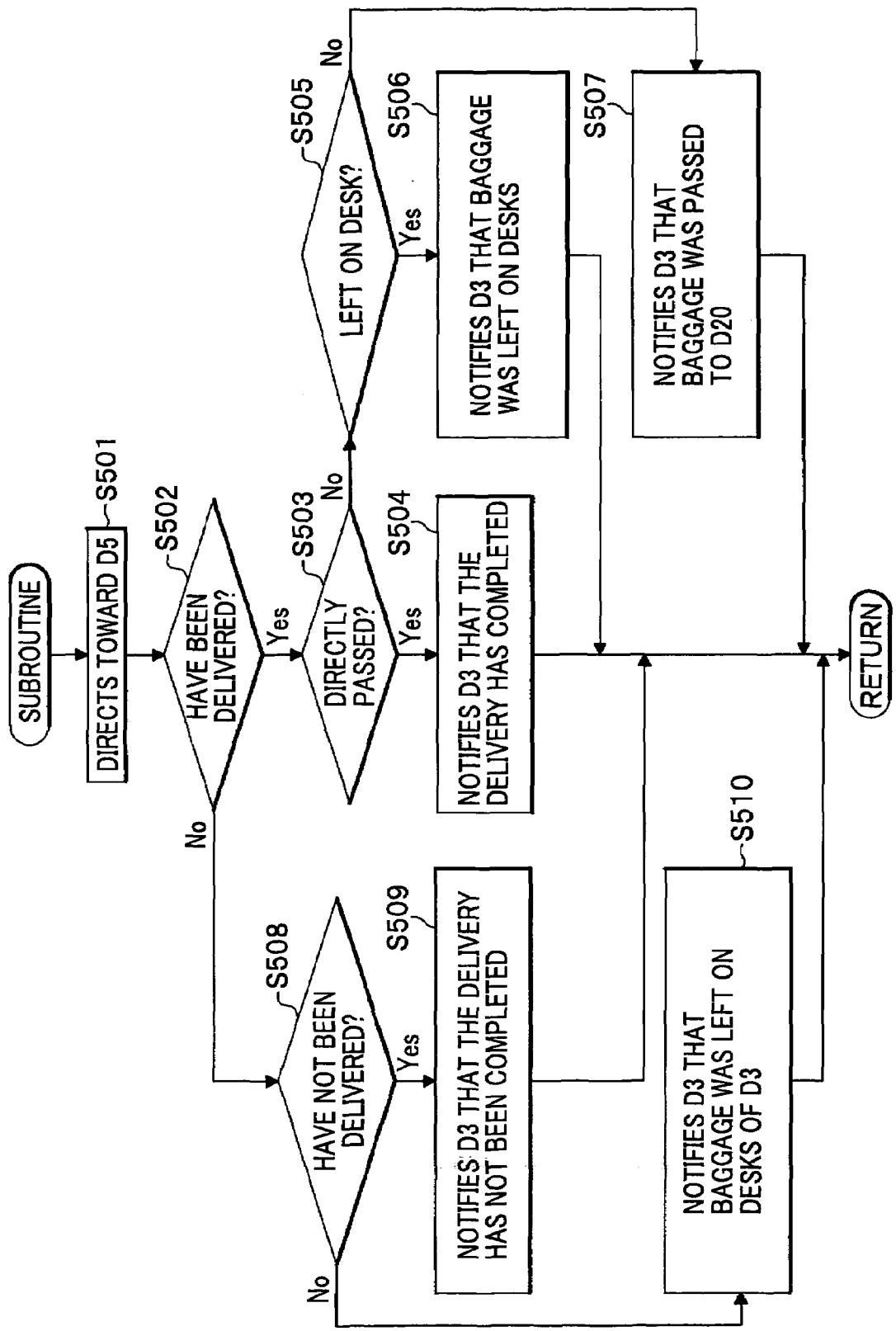

POSITION DETECTION SYSTEM FOR MOBILE OBJECT

BACKGROUND OF THE INVENTION

1. Field of the Invention

The present invention relates to a position detection system for a mobile object, more specifically, relates to a position detection system, which can measure a position (distance and direction) of the mobile object adapted to move around a predetermined area. Additionally, the present invention relates to a motion control of a robot adopting this system.

2. Description of Relevant Art

In recent years, an autonomous mobile robot has been developed. Especially, the recent developments in this technique have been focused on an autonomous bipedal walking robot.

Additionally, a voice recognition apparatus which converts a voice message to text data and a voice synthesis apparatus which sounds a synthesized voice by synthesizing the synthesized voice from text data have been developed, and have been adopted for various apparatus. A mobile robot equipped with such kind of apparatuses, i.e. a voice recognition apparatus and a voice synthesis apparatus, which are adapted in order to have a dialogical communication with a person, has been developed.

For realizing an autonomous communication between a mobile robot and a person, the mobile robot has to search and identify a person and has to move toward the identified person.

For achieving this requirement, an apparatus, which detects a presence of a target object within a specific area and measures the position within the specific area of the detected target objects, and the method thereof have been developed.

As an example of these conventional apparatus, apparatuses disclosed in Japanese unexamined patent publications, such as JP2002-307338, JP2003-91678, and JP2002-98749, have been discovered.

The apparatus disclosed in JP2002-307338 detects a presence of a target object by checking whether or not an infrared radiation from the target object is sensed by an infrared sensor (human sensor).

The apparatus disclosed in JP2003-91678 detects a presence of a target object using a plurality of detectors which are disposed within a specific area, and the position of the detector which sensed the target object is regarded as the position of the target object.

The apparatus disclosed in JP2002-98749 detects a presence of a target object using a plurality of transmitters, which are disposed within a specific area, and a transmitter, which is provided on a target object. In this apparatus, field intensity of radio wave transmitted from the target object's transmitter and field intensity of radio wave transmitted from the transmitter provided within the specific area are computed, and the position of the target object is measured using these computed field intensities.

In the case of JP2002-307338, however, the detection of the target object can be achieved only when the target object is within a detectable range of the infrared sensor (human sensor). That is, if the target object is out of the detectable range, the detection of the target object cannot be achieved.

In the case of JP2003-91678 and JP2002-98749, following defects exist. (1) Since a plurality of detectors or transmitters are required for detecting a target object, the cost of the apparatus becomes high; (2) If a target object moves around the wide range, the detection of the target object can be achieved only when the target object is within the specific area where detectors and transmitters are provided; and (3) Rough position of the target object can be measured but the accurate position of the target object, such as a direction and distance from the detector (transmitter), cannot be measured.

Here, if at least one of the target object and the detector is a mobile object, e.g. if the target object is a mobile object and the detector itself is a mobile robot, the area where the mobile robot is installed for detecting a person changes continuously. In this case, since the provision of a plurality of detectors and transmitters in the area beforehand is simply impossible, the apparatuses disclosed in above references were inadequate apparatuses.

In the case of conventional apparatuses, i.e. an apparatus for measuring the position of the mobile object, there have been the following defects. That is, since the manufacturing cost of RFID is low, the problem due to cost does not occur when RFID is used as transmitter, even if the number of the person to be detected is increased. But, since power of radio wave is small, the adaptable range of the apparatus is limited to a narrow range.

When increasing the adaptable range of the apparatus, however, the transmitter whose power of radio wave is much high or a plurality of receivers, which are provided at a predetermined interval, is required. In this case, the adoption of the transmitter having high power increases the manufacturing cost thereof, and causes the problems in cost if each person is provided with the transmitter having high power.

Additionally, if a plurality of receiver is provided at a predetermined interval, this requires the cost of infrastructure and limits the adaptable range to a narrow range. Additionally, since attenuation of radio wave transferred from the transmitter occurs if obstacle exists in a predetermined area, this decreases the accuracy in the position detection of the target object.

In the case of the apparatus disclosed in JP2002-98749, since attenuation of radio wave transferred from the transmitter occurs if RFID is used as the transmitter and obstacle exists in the specific area, this decreases the accuracy in the position detection of the target object.

Therefore, a system, which can detect with accuracy the position within a wide controlled area of the target object without requiring additional equipments even if the transmitter whose transmission power is small is adopted as the transmitter on the mobile object, has been requested.

BRIEF DESCRIPTION OF THE DRAWINGS

The present invention relates to a position detection system for measuring a position of a mobile object traveling throughout a controlled area. This system includes a tag provided on the mobile object, a detector obtaining object position information which indicates the position of the mobile object, object position information includes direction information and distance information relative to the detector of the mobile object, and the detector travels throughout the controlled area, a base station obtaining detector position information which indicates the position of the detector, detector position information includes an absolute position and angle within the controlled area of the detector. In this system, the absolute position within the controlled area of the mobile object is measured based on object position information and detector position information.

According to this system, the transmission distance r of the object information (direction information and distance information) transferred from the tag corresponds to the distance between the mobile object and the detector, even if the position detection system is applied to a wide controlled area. That is, the transmission distance of object information is kept within a predetermined distance.

Figure 1:
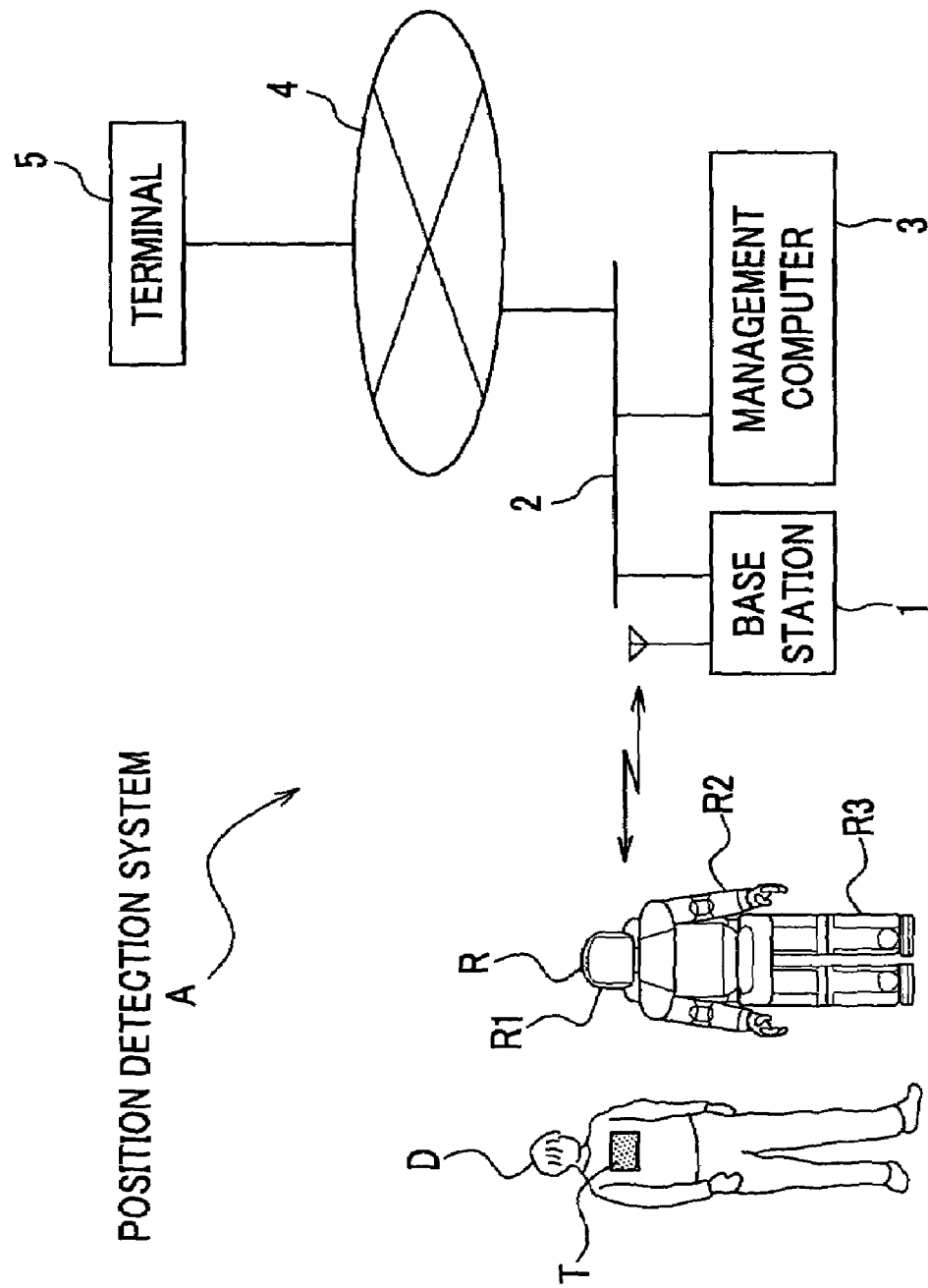

Therefore, the data exchange between the mobile object and the detector can be achieved effectively, even if the transmission power of the tag is small.

Thus, the accurate position within the controlled area of the mobile object can be measured from object position information and detector position information, when the base station acquires object position information detected by the detector and detector position information.

In the present invention, the detector may include a light emitter emitting light signals of predetermined wave length in radial direction, and a radio wave receiver transmitting radio wave of predetermined frequency and receiving radio wave from the tag. Additionally, t is preferable that the tag transmits a receipt signal toward the detector, when at least one of the light signal of predetermined wavelength that is irradiated from the detector or the radio wave of predetermined frequency is received.

In this case, it is preferable that the light signal includes direction information which is a information indicating an irradiation direction of the light signal, and that at least one of radio wave and light signal includes a unique identification number for specifying the detector which has transmitted radio wave or light signal.

Additionally, it is preferable that the receipt signal includes direction information and the unique identification number of the detector in addition to the tag ID which is a unique identification number assigned to the tag. Here, direction information and unique identification number of the detector are the information being included in the light signal and radio wave which was received by the tag.

In this case, the following benefits are brought out from the system of the present invention. That is, the controlled area where the mobile robot moves around freely can be enlarged without providing additional new equipments even if power of tag provided on the mobile object is small. In this case, since the tag whose power is small can be used as the tag to be provided on the mobile object, this does not cause any problem in cost and any legal problem.

According to the present invention, the detector computes the distance between the tag and the detector, based on the field intensity of the receipt signal when the receipt signal transferred from the tag was received by the radio wave receiver, and regards the computed distance as distance information. Then, the detector can generate object position information, from this distance information and direction information which was included in the receipt signal.

In the present invention, furthermore, tag ID for specifying the tag is assigned to the tag. Therefore, the identification of each mobile object can be achieved using the tag ID of the tag provided on the mobile object, even if a plurality of mobile objects is within the controlled area.

In the present invention, the base station may include a detector controller, which controls the detector which travels throughout the controlled area, and an object position computing unit, which receives object position information and detector position information and measures an absolute position within the controlled area of the mobile object. Here, object position information and detector position information are the information transferred from the detector. Further more, the base station may include an ID identification unit performing an identification of the mobile object, by referring to a database based on the tag ID from the detector.

According to the present invention, the accurate measurement of the position of the mobile object can be achieved while performing the identification of the mobile object by the base station. Thus, the travel of the mobile object can be determined based on the position of the mobile object.

Therefore, if the detector is a mobile robot, since the direction and distance to the person from the mobile robot is computed by the object position computing unit, the mobile robot can travel and approach toward the person with tag. Thereby, the mobile robot can have a dialogue with the person.

In this system, especially, the transmission of radio wave from the radio wave receiver and irradiation of light signal from the light emitter are repeated at a predetermined interval under the control of the detector controller. Thus, the direction and distance to the tag can be measured timely by receiving the receipt signal from the tag, which has received radio wave or light signal, even if the position of the tag and mobile robot change continuously. Thereby, the mobile robot can travel to the position, which was measured just now, by correcting appropriately the route of the travel of the mobile robot.

In this case, therefore, the mobile robot can travel to the person with tag while correcting the route of the travel of the mobile robot even if the mobile robot take evasive action of obstacles which are on the route of the travel of the mobile robot. Here, a child without tag or a pet animal can be example of the obstacle.

According to the present invention, since the positional relation (direction and distance with respect to the mobile robot of the person), which changes continuously, can be measured timely, the mobile robot can travel to the measured position of the person based on the positional relation.

Furthermore, it is preferable that the detector is an autonomous bipedal walking robot. In this case, the detector may include a position identification unit, which identifies the position of the mobile object based on object position information and detector position information, and a travel controller, which controls the travel of the detector to the position identified by the position identification unit. Additionally, the detector may include a personal information acquisition unit, which obtains the personal information being correlated with the tag ID included in the receipt signal, and a motion determination unit, which determines a dialogue with the person or a motion of the mobile object based on the personal information. Here, it is preferable that the mobile object is a person with the tag, and the detector may include a dialogue controller which controls a dialogue with the person.

According to the present invention, the mobile object can provide various kinds of processing capabilities after moving the detector in the vicinity of the mobile object.

BRIEF DESCRIPTION OF THE DRAWINGS

FIG. 1 is a block diagram of a target object detection system A according to the present embodiment.

Figure 2:
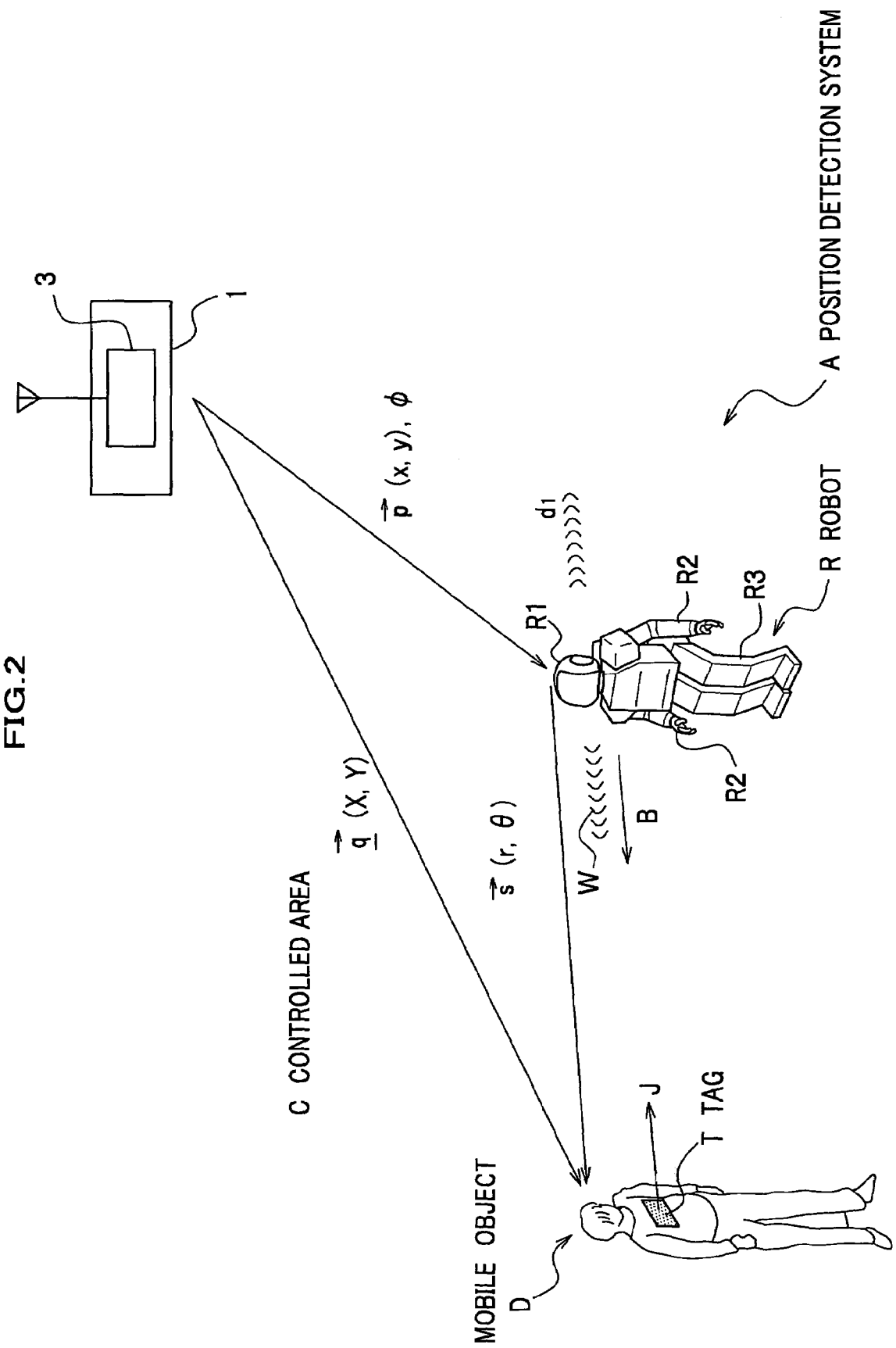

FIG. 2 is an explanatory view of the data exchange which is performed by the mobile object D, the robot R, and the management computer 3 one another when the mobile object D and the robot R is within the controlled area C.

Figure 3:
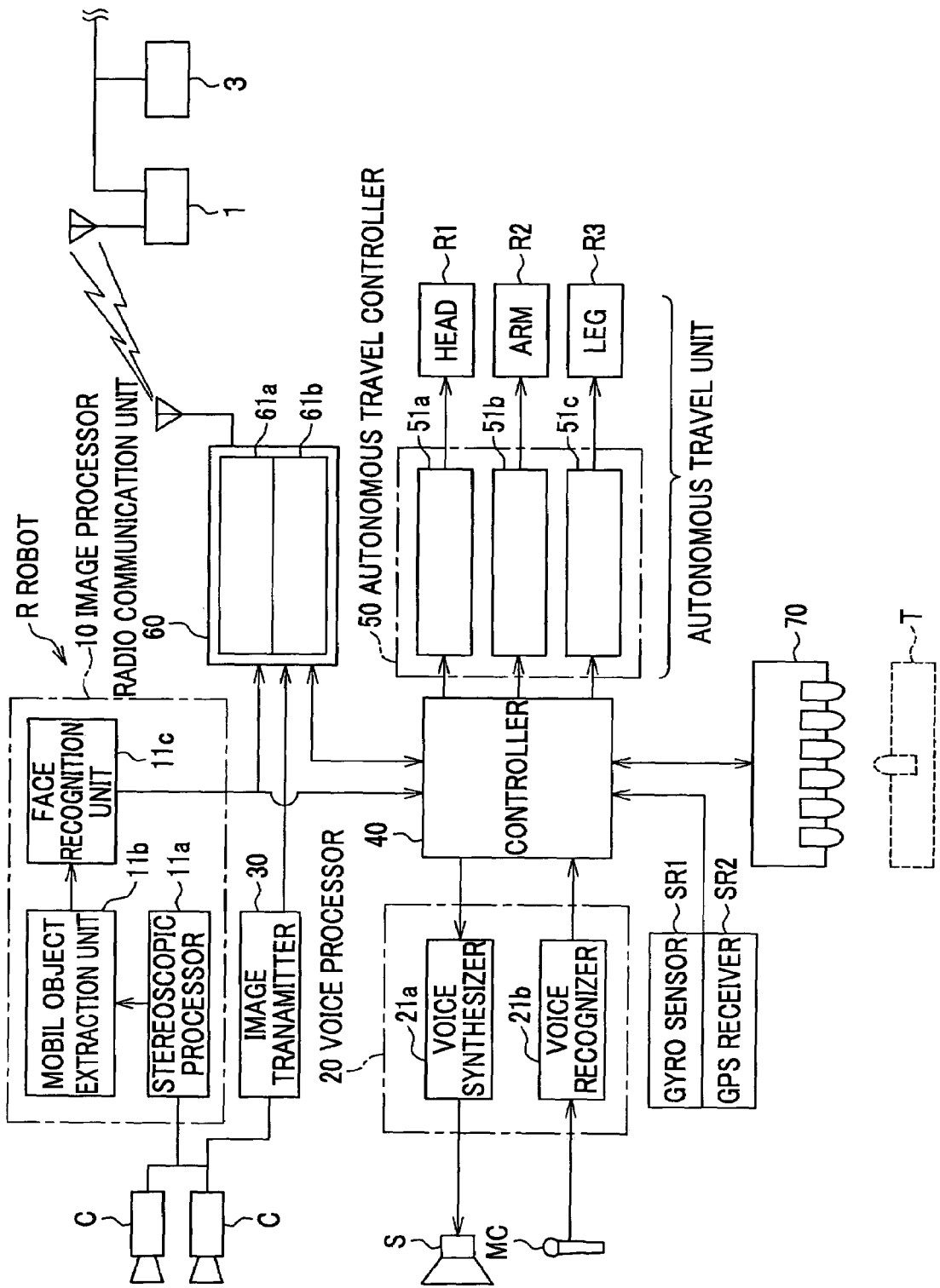

FIG. 3 is a block diagram of the robot R.

Figure 4:
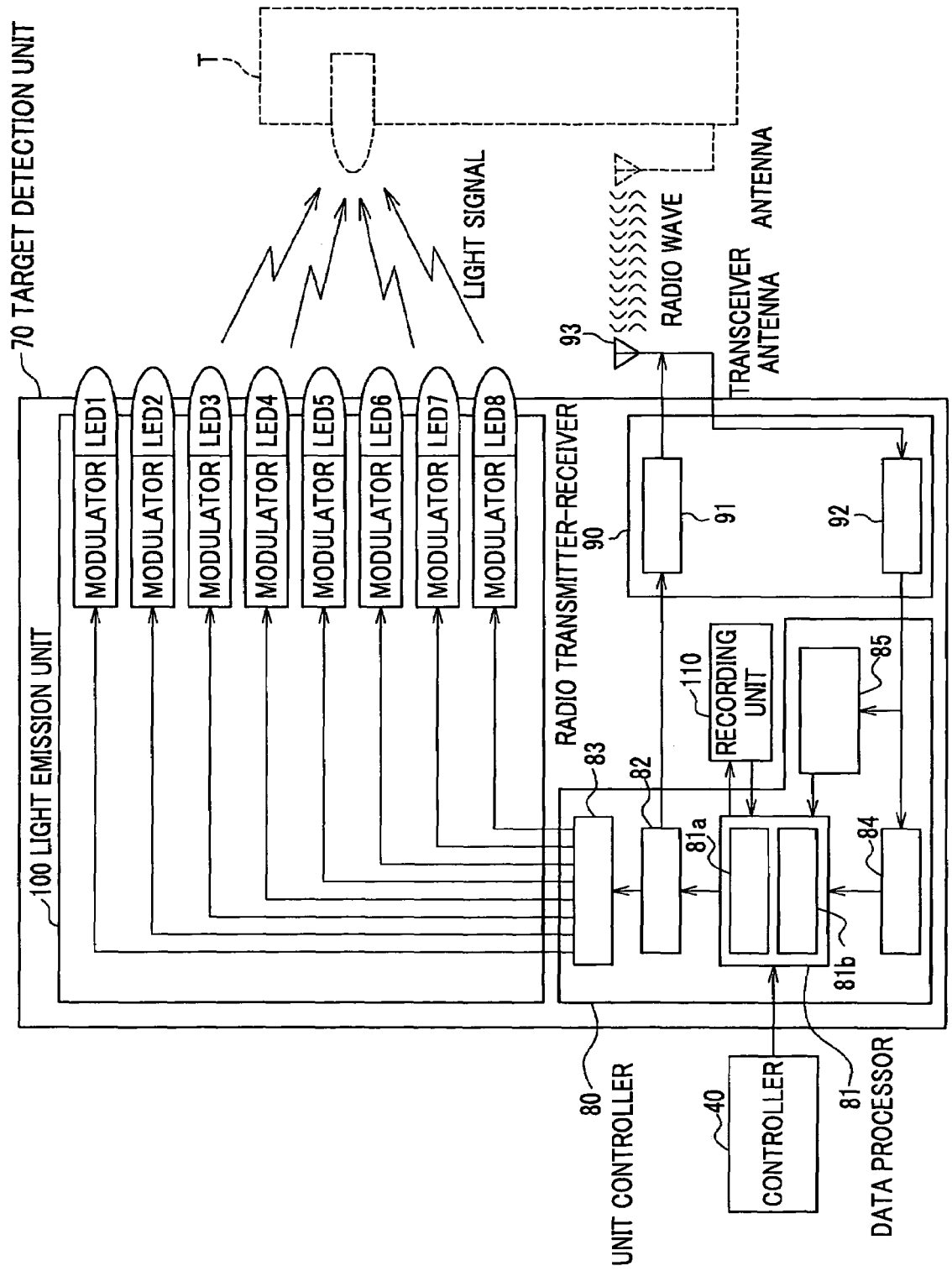

FIG. 4 is a block diagram of a mobile object detection unit 70 of the robot R.

Figure 5B:
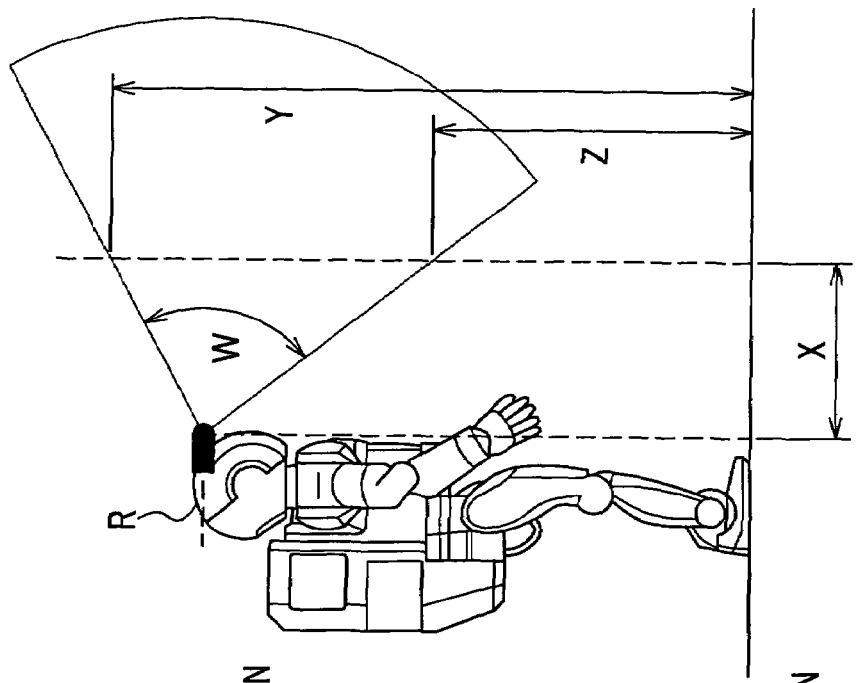
Figure 5A:
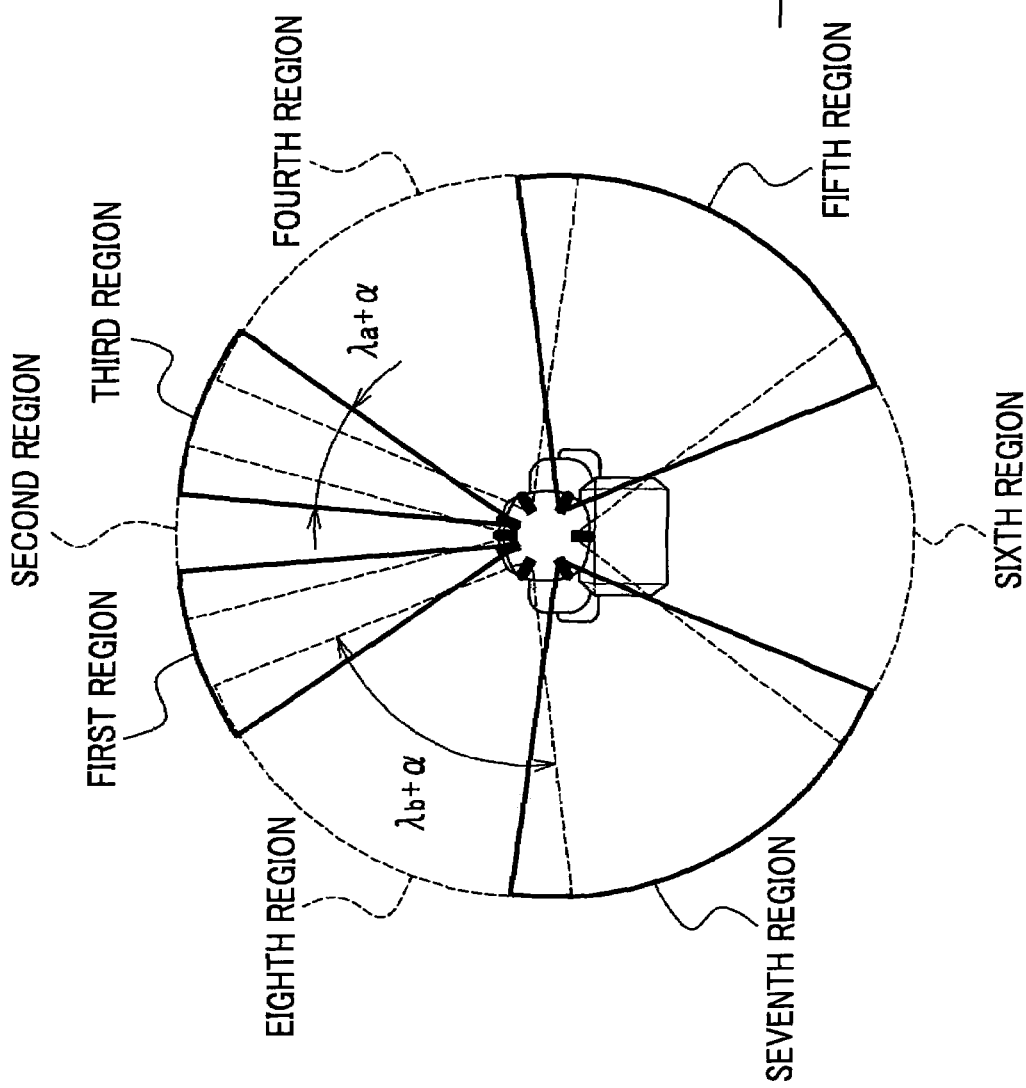

FIG. 5A is an explanatory view of a search region established around the robot R.

FIG. 5B is an explanatory view of an irradiation range in a height direction of an infrared light irradiated from the light emitter of the light emission unit 100.

Figure 6:
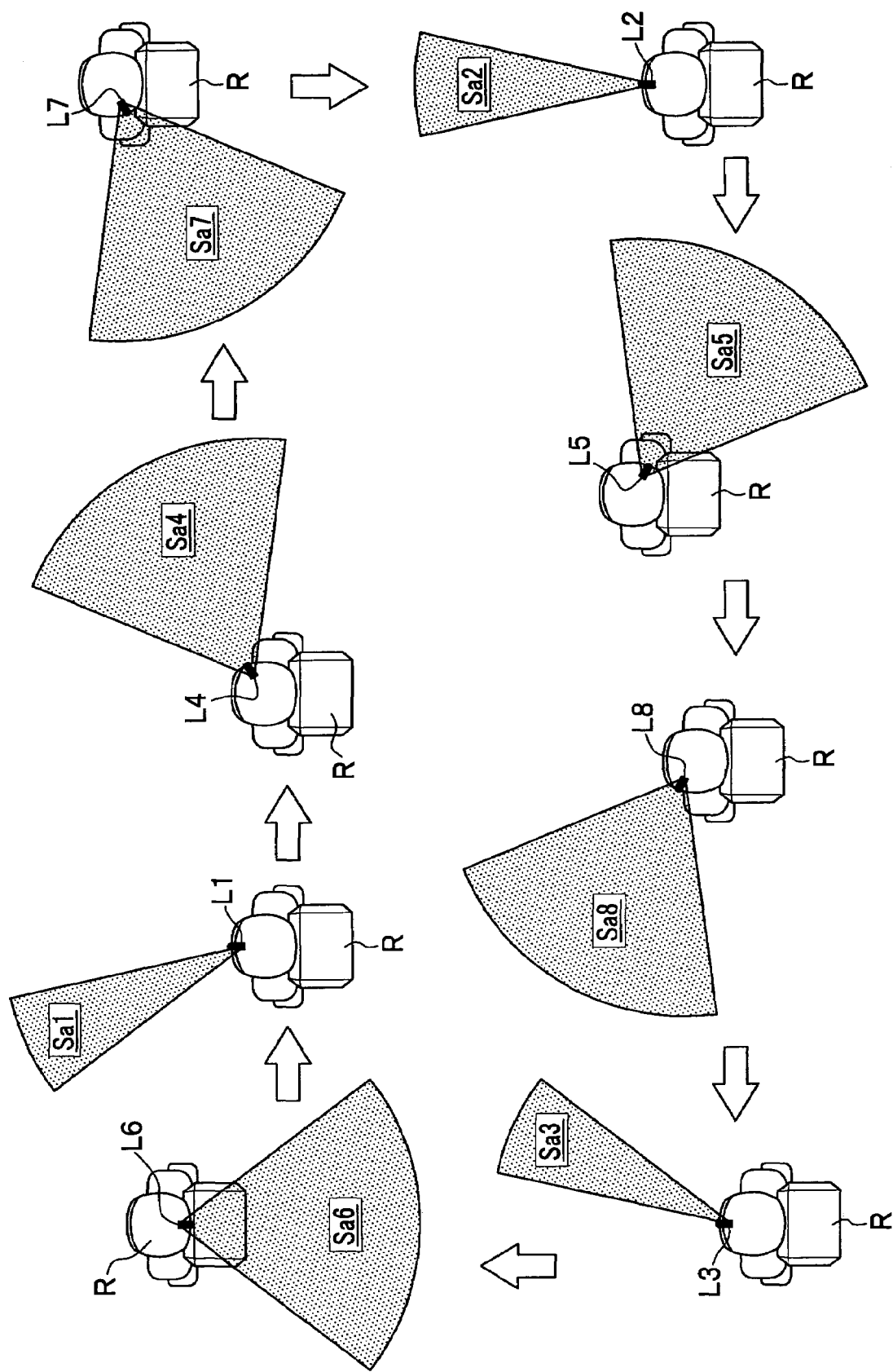

FIG. 6 is an explanatory view of the order of the emission of each light emitter provided on the robot R.

Figure 7:
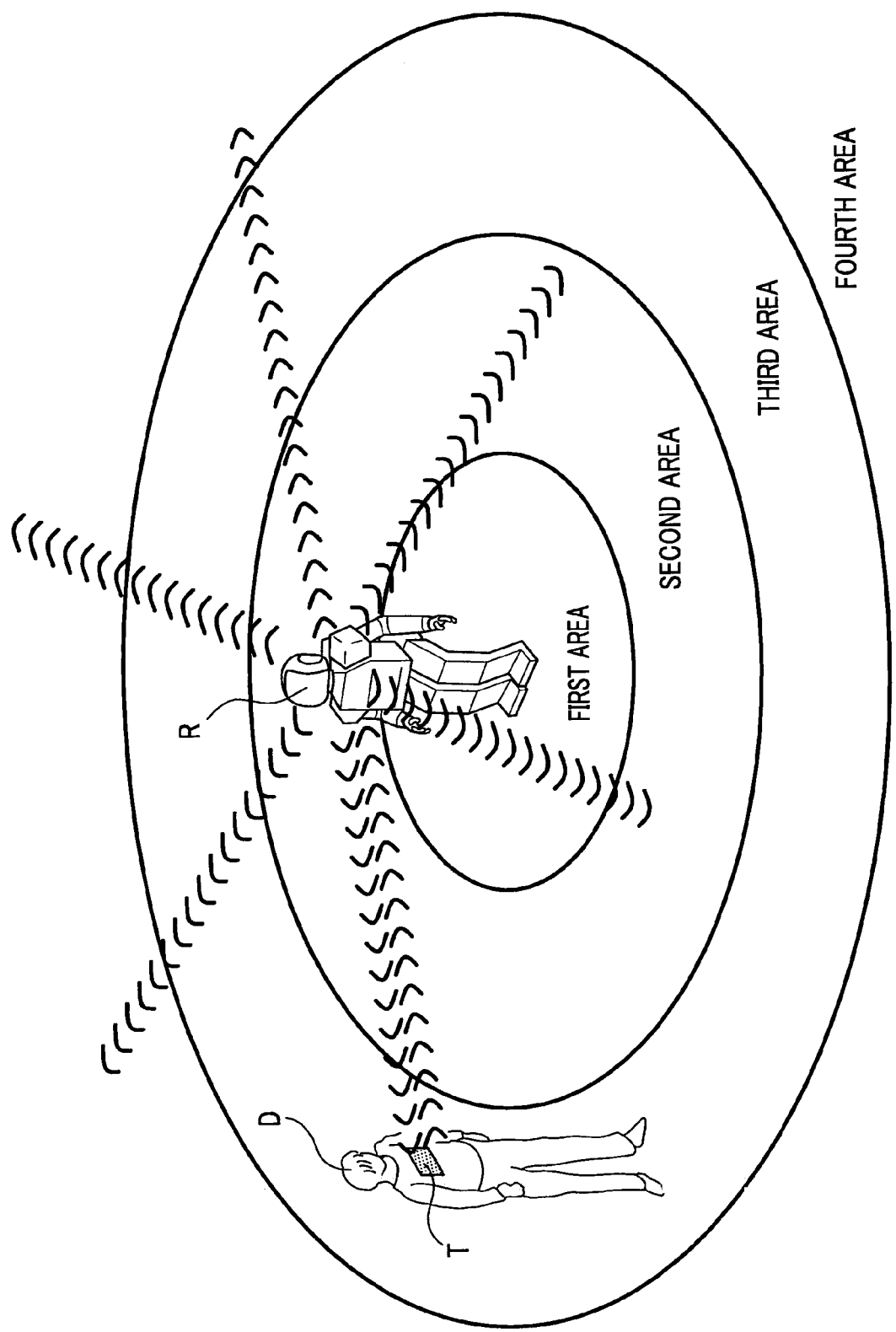

FIG. 7 is an explanatory view of the generation based on the field intensity of the information (area information) which indicates which area the target object exists in.

Figure 8:
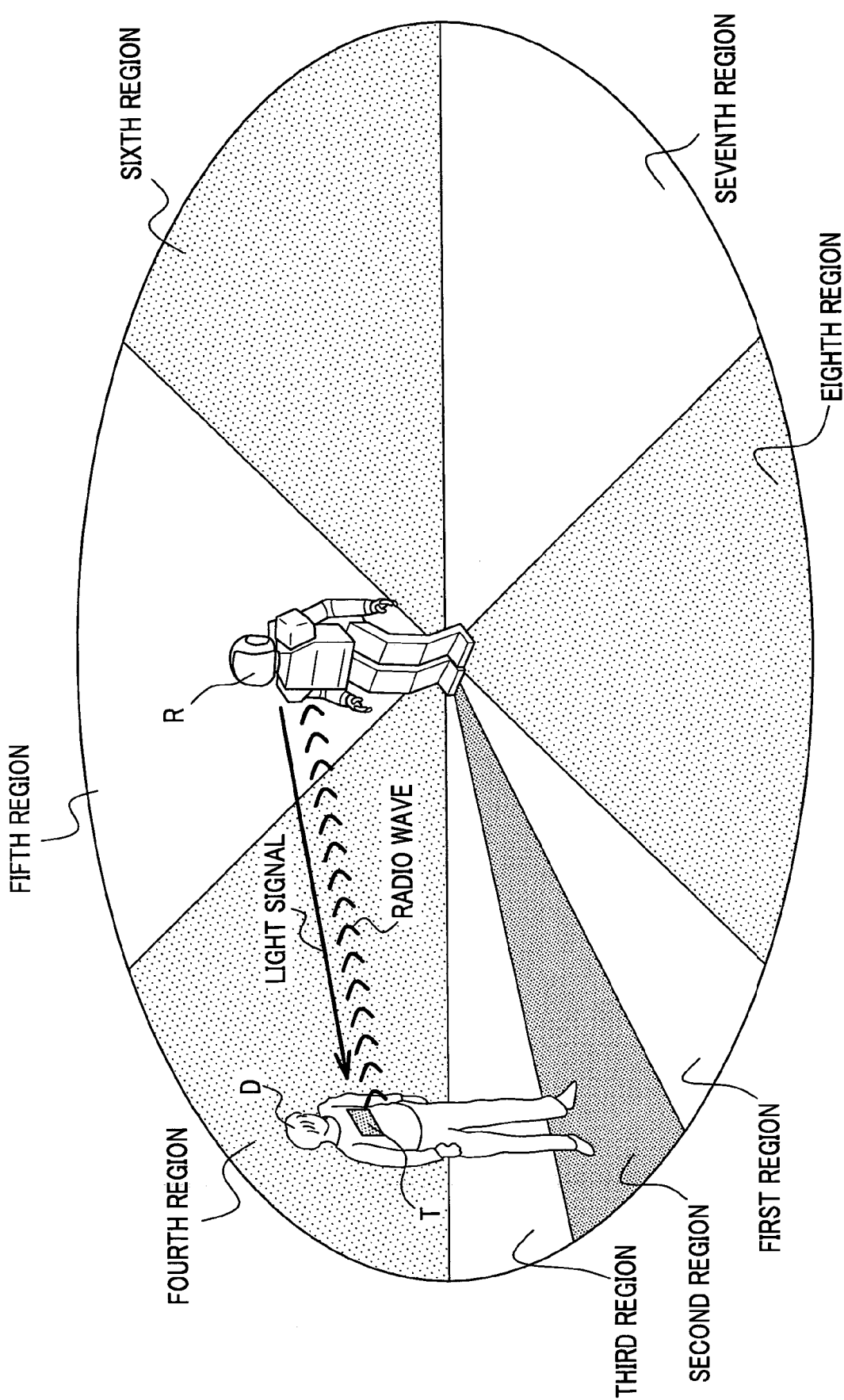

FIG. 8 is an explanatory view of the generation of information (direction information) which indicates the direction of the target object.

Figure 9:
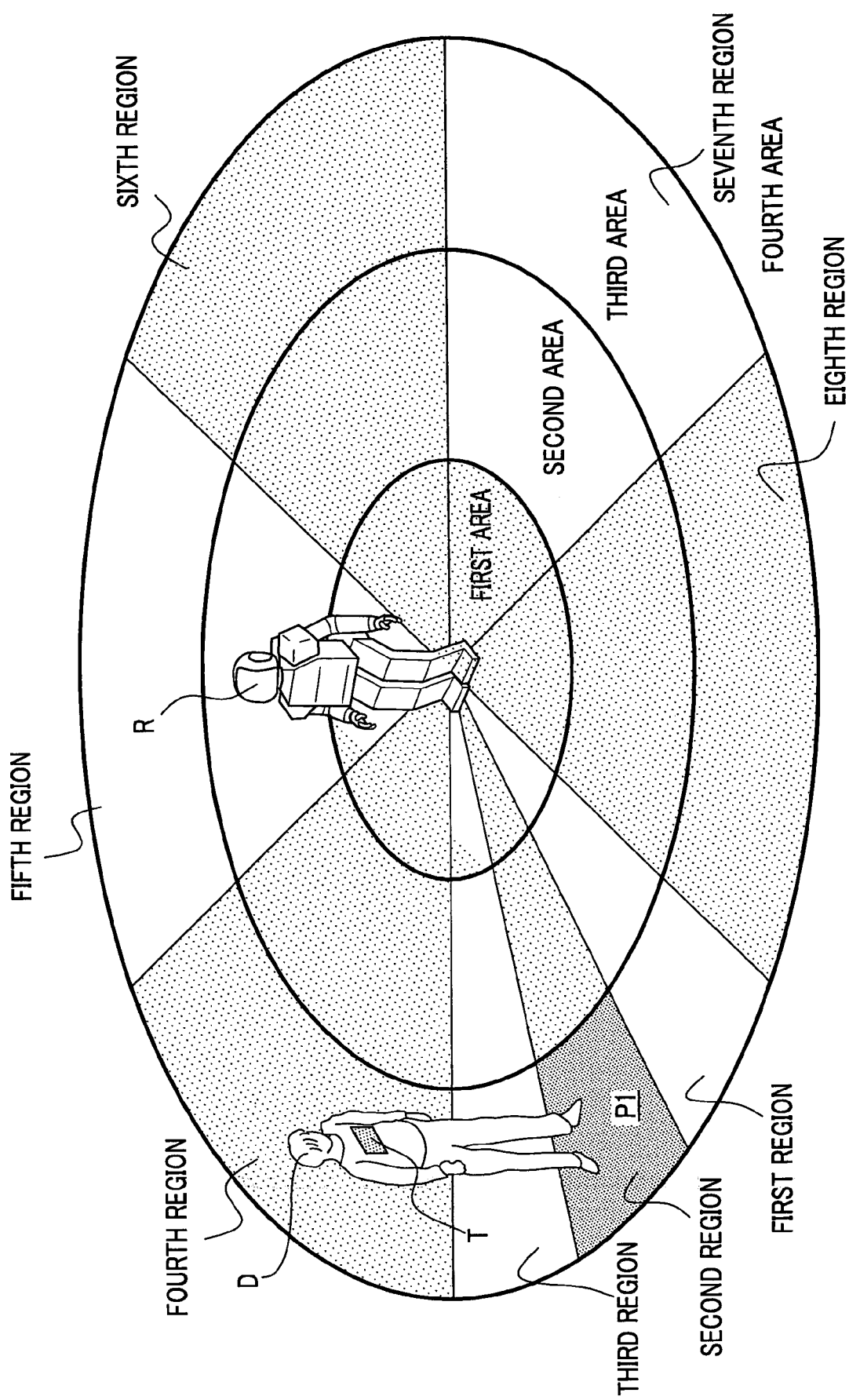

FIG. 9 is an explanatory view for determining the position of the target object D based on direction information and area information.

Figure 10:
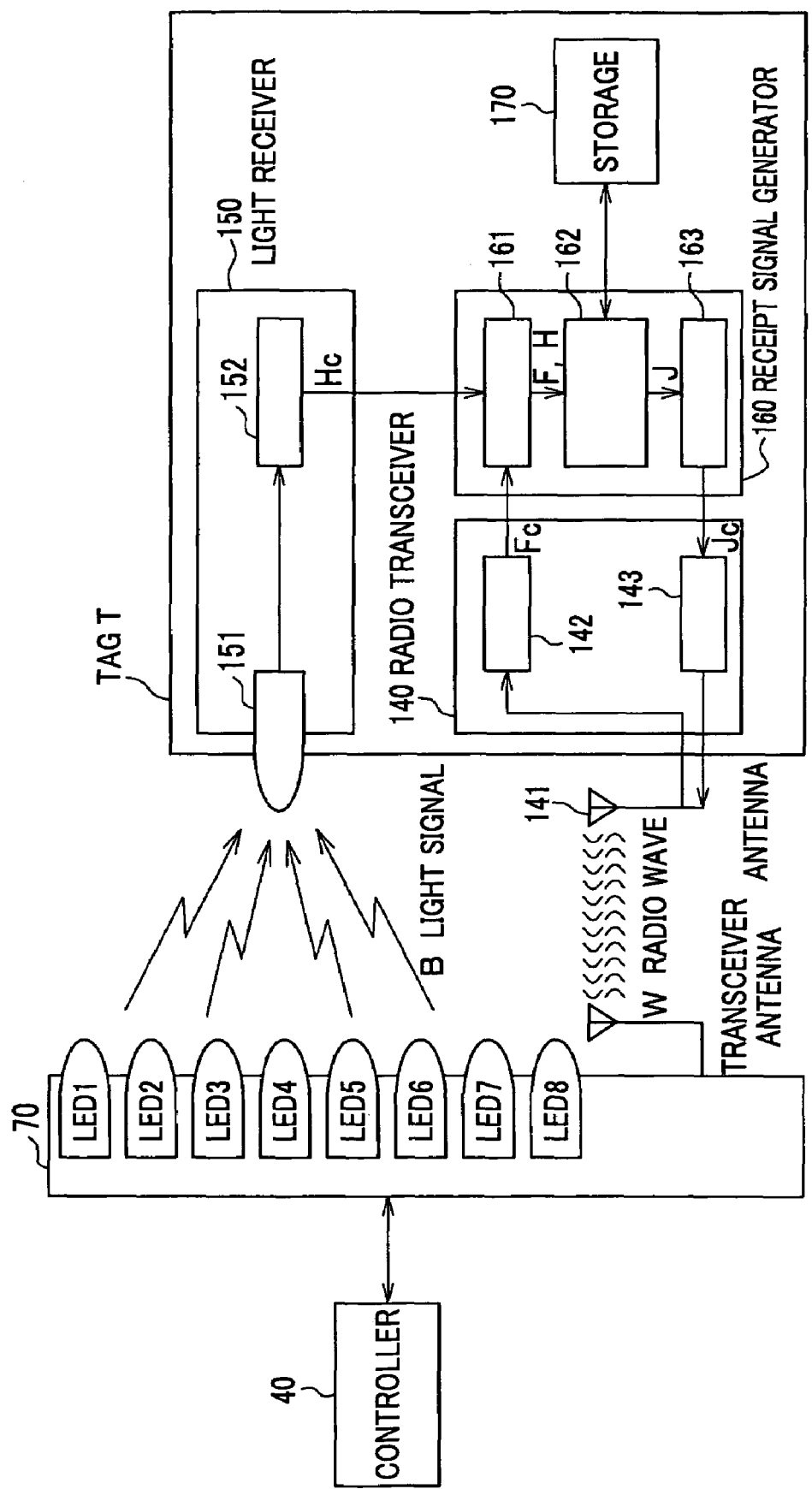

FIG. 10 is a block diagram of the tag T1 which serves as the target object D.

Figure 11:
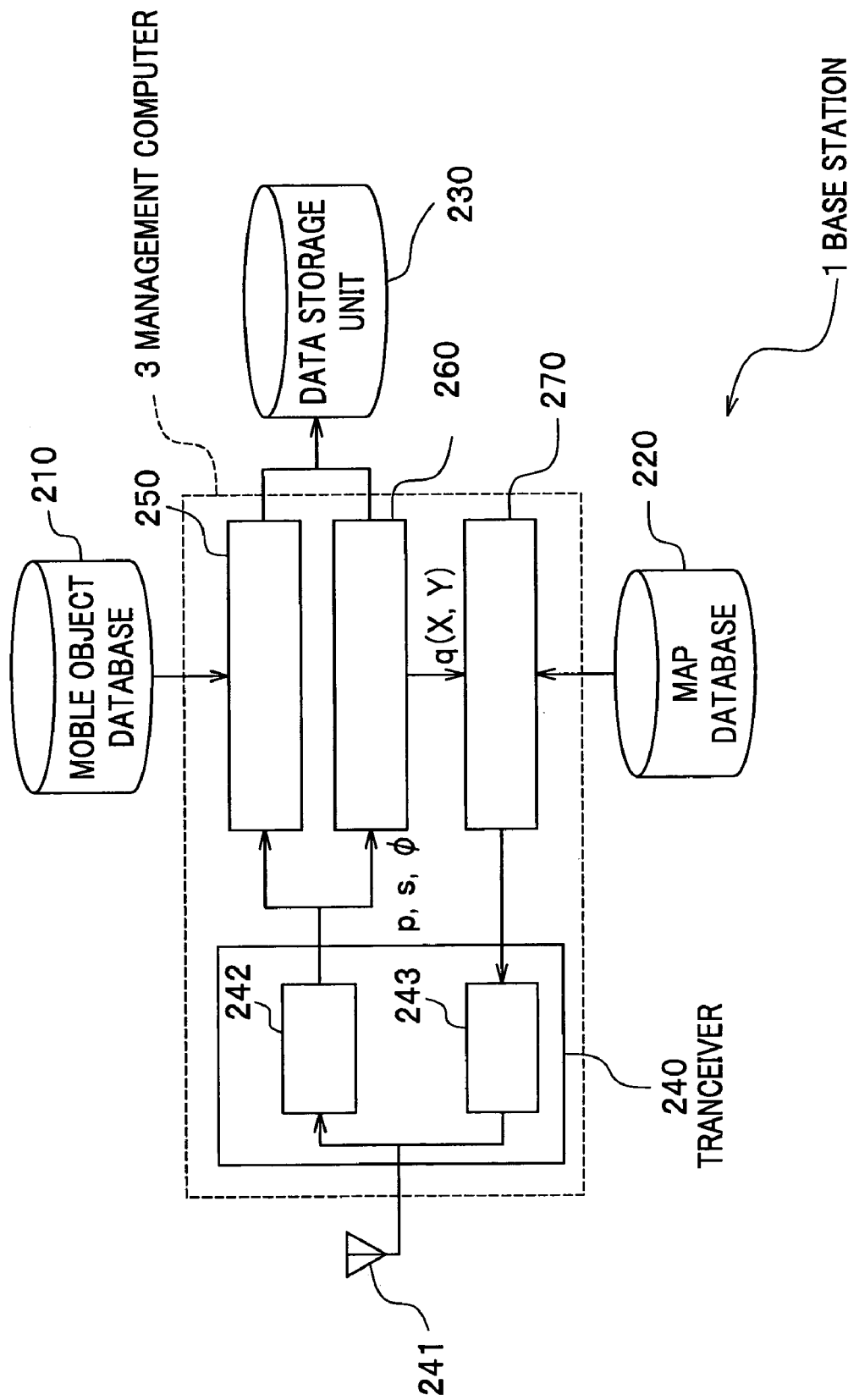

FIG. 11 is a block diagram of a base station 1.

Figure 12:
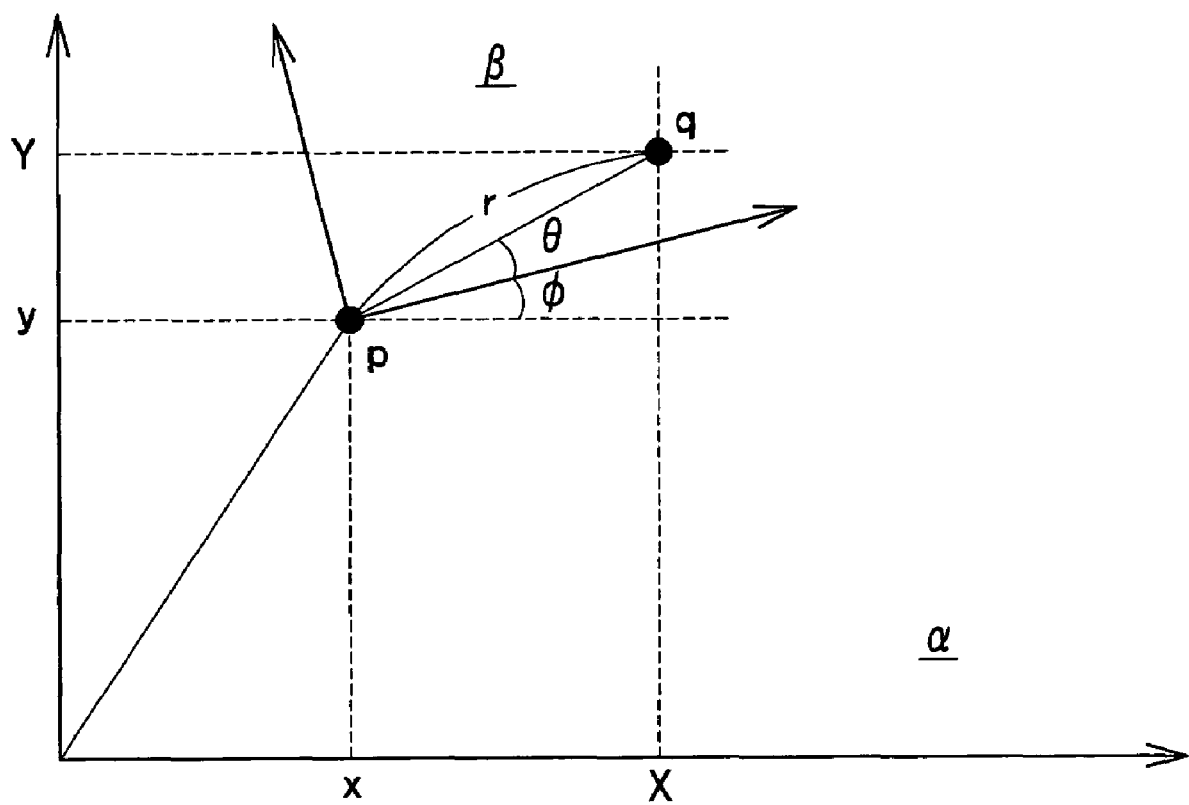

FIG. 12 is an explanatory view of the computing of the absolute position (position vector q) within the controlled area C of the mobile object D.

Figure 13:
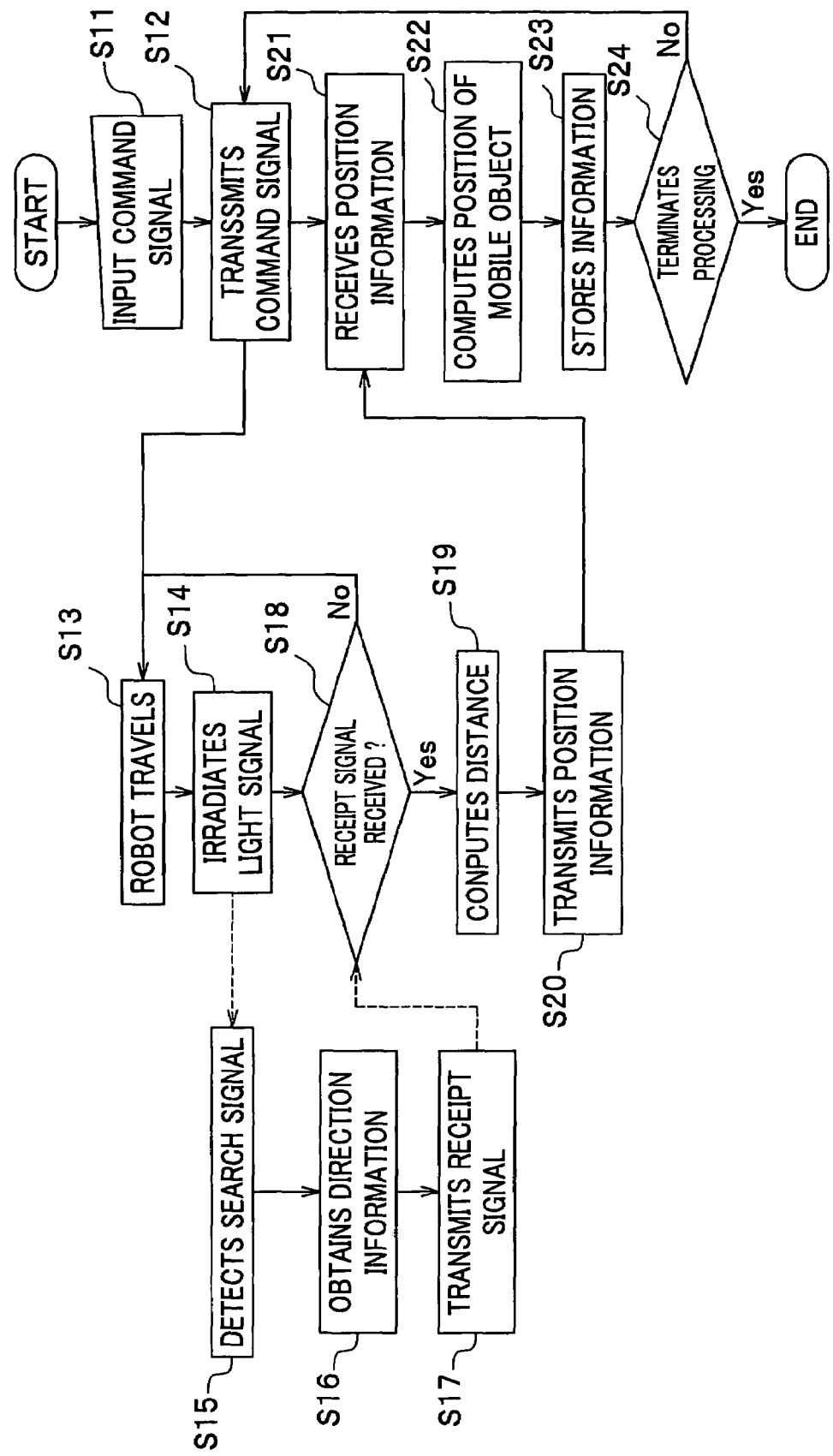

FIG. 13 is a flow chart for explaining motion example 1 of the position detection system of the present embodiment.

Figure 14:
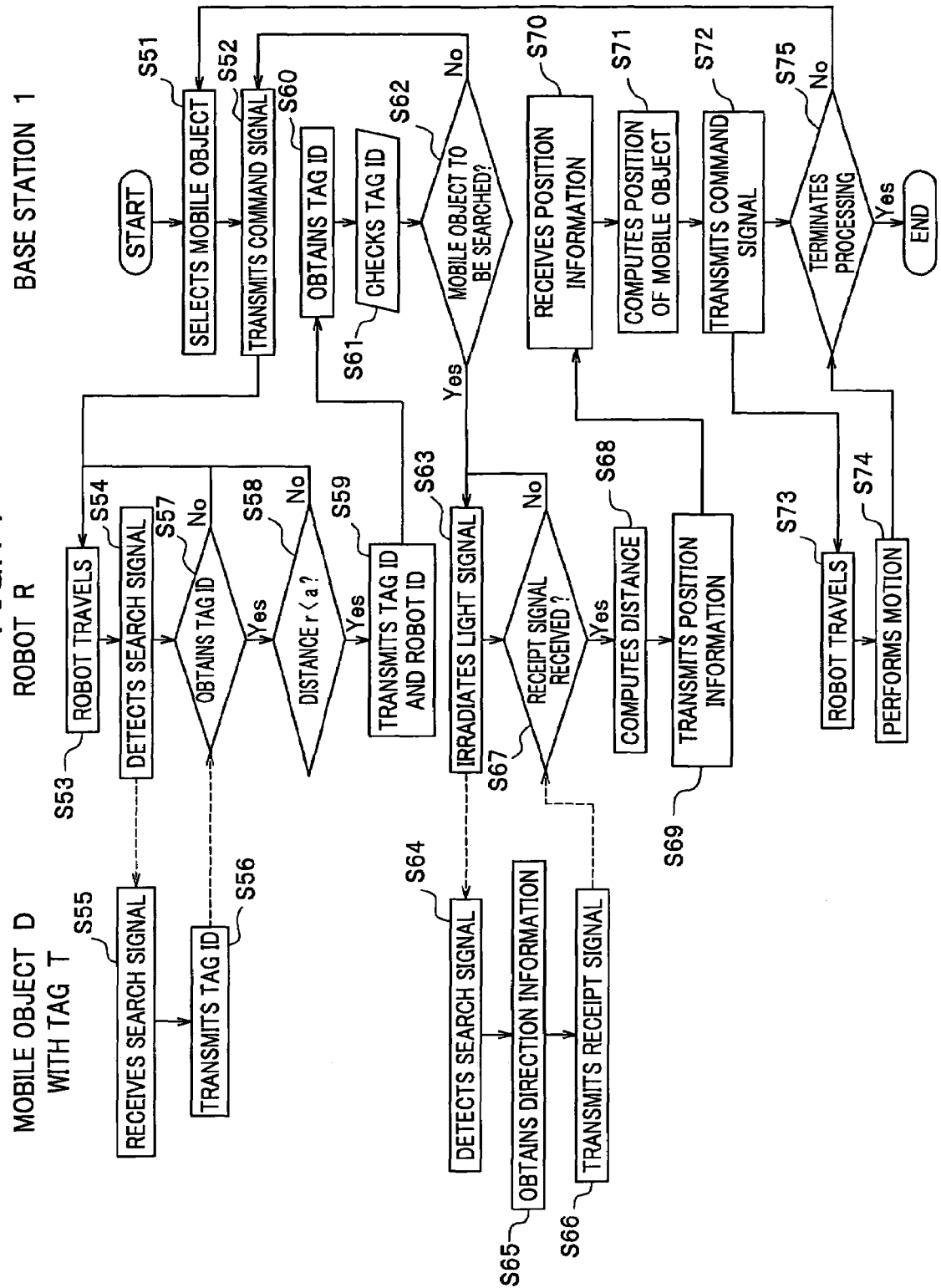

FIG. 14 is a flow chart for explaining motion example 2 of the position detection system of the present embodiment.

Figure 15:
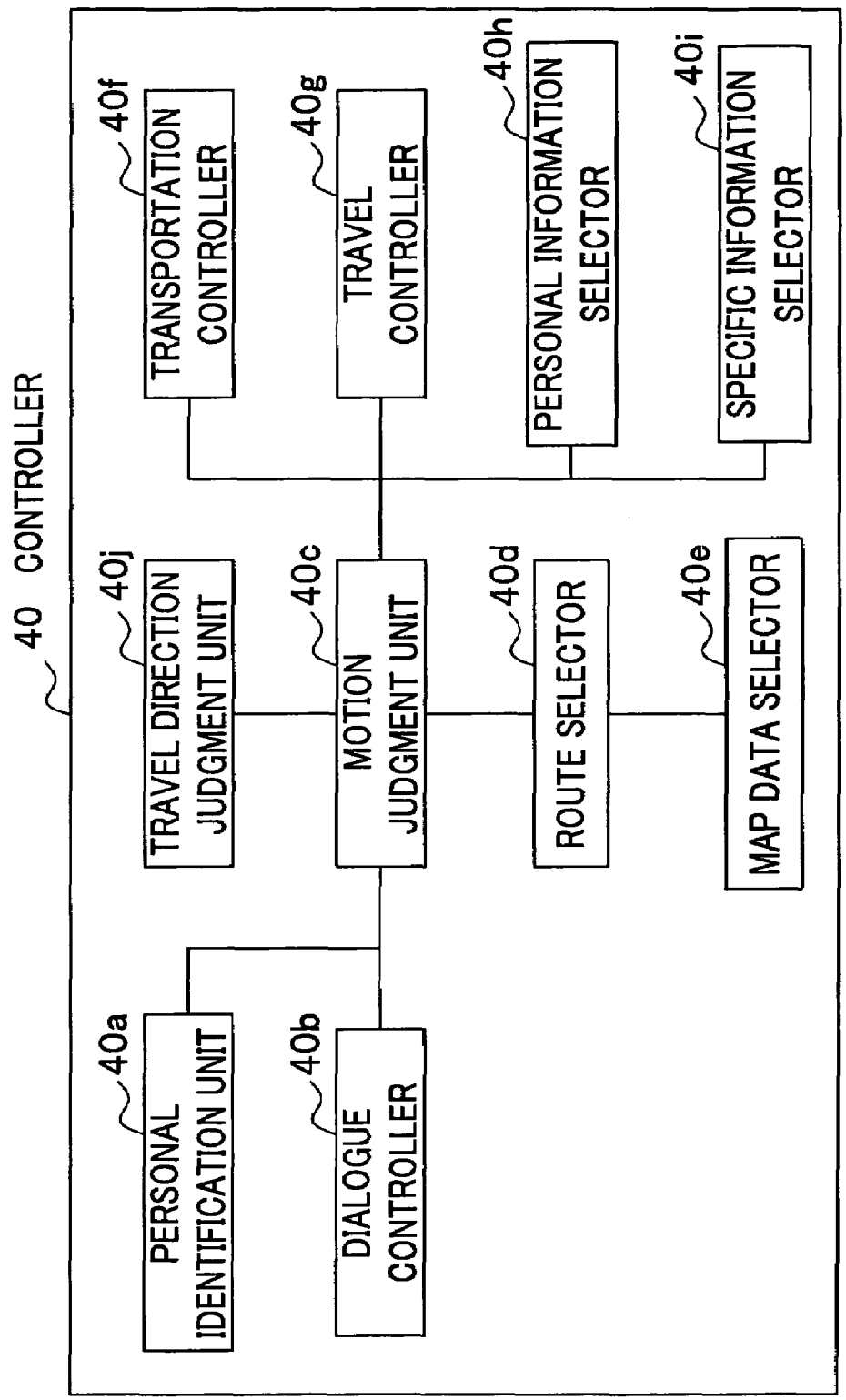

FIG. 15 is a block diagram of the controller 40 of robot R of the second embodiment.

Figure 16:
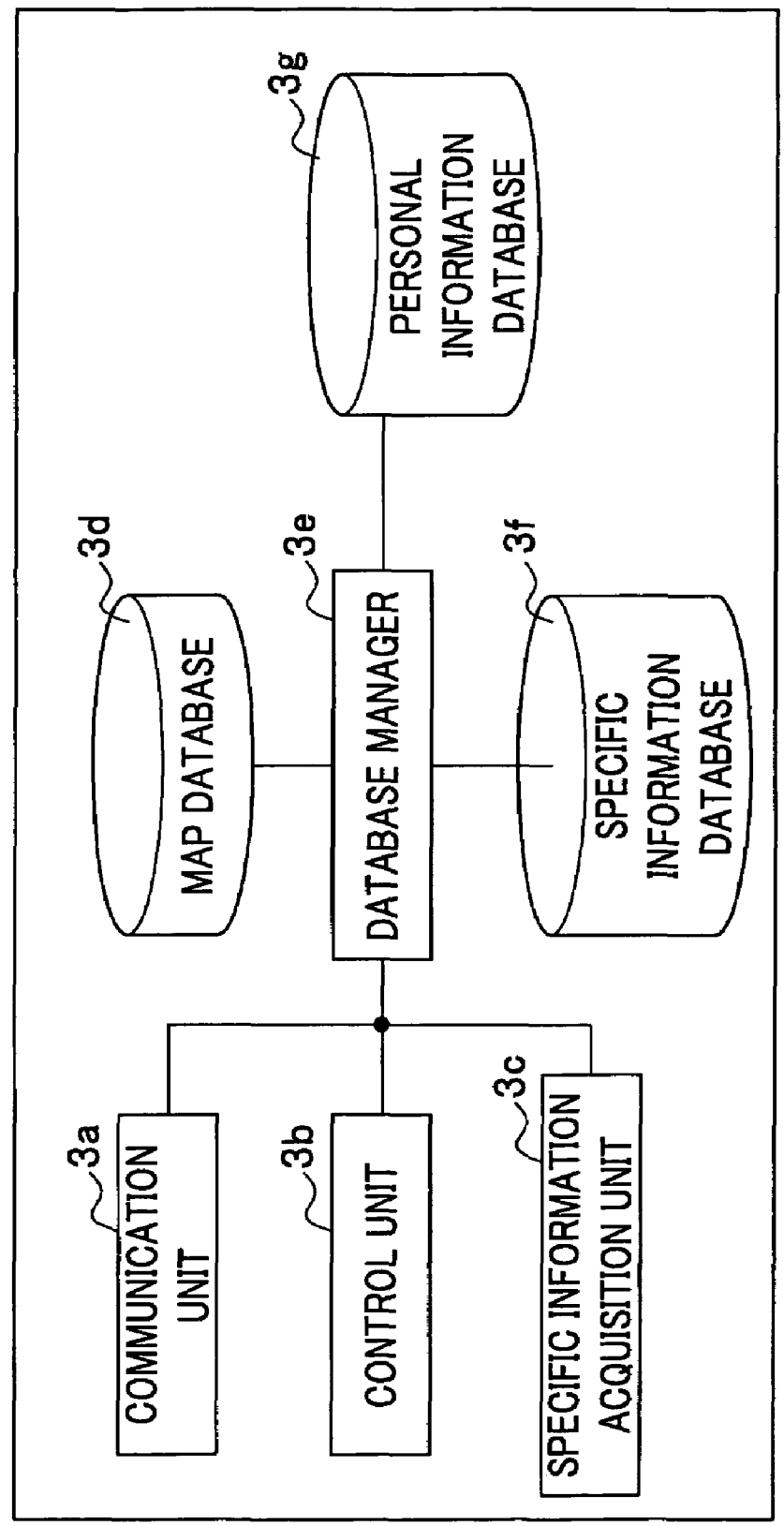

FIG. 16 is a block diagram of the management computer 3 of robot R of the second embodiment.

Figure 17:
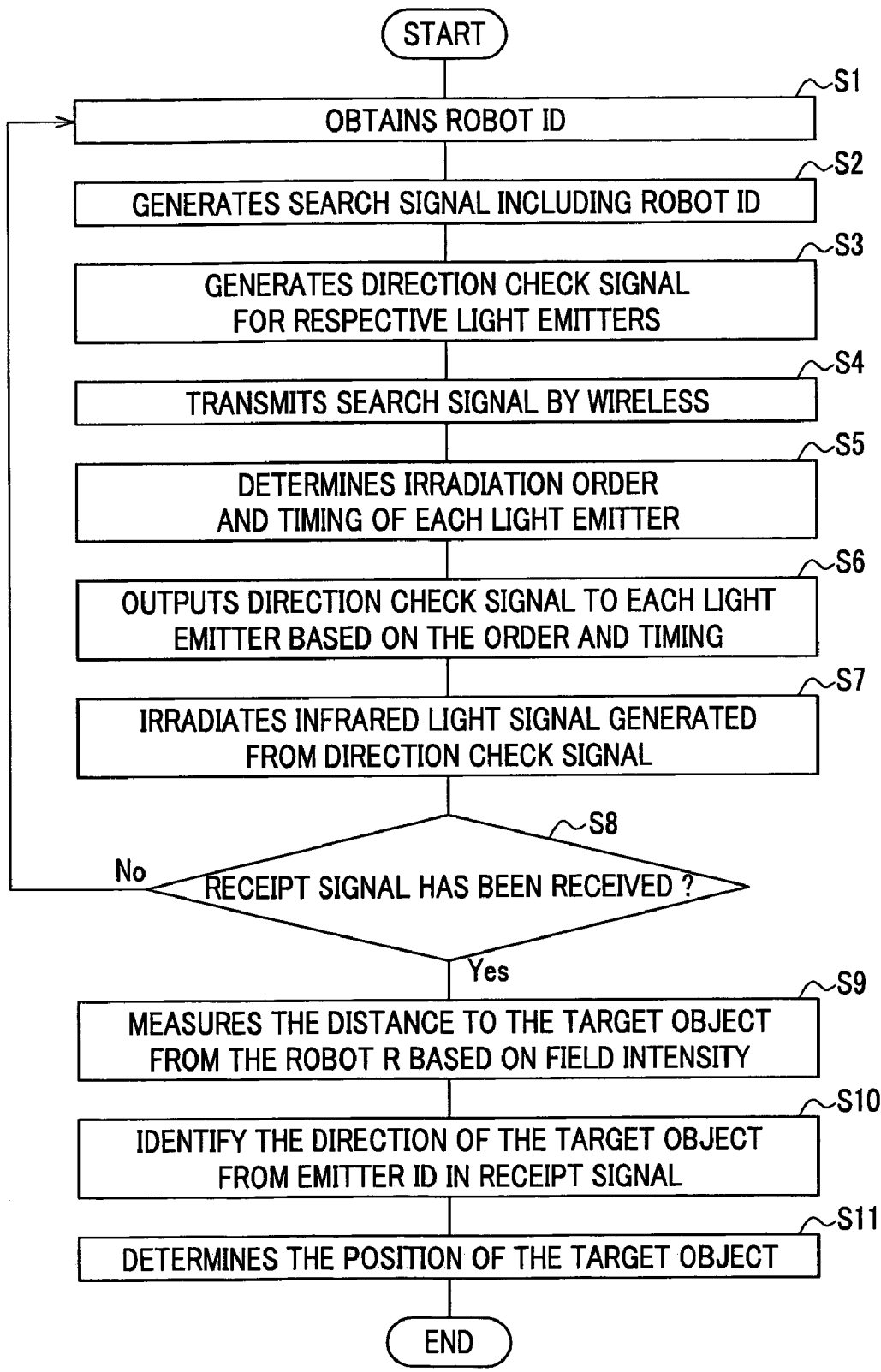

FIG. 17 is a flow chart of the signal processing of the object detection unit 70 of the robot R.

Figure 18:
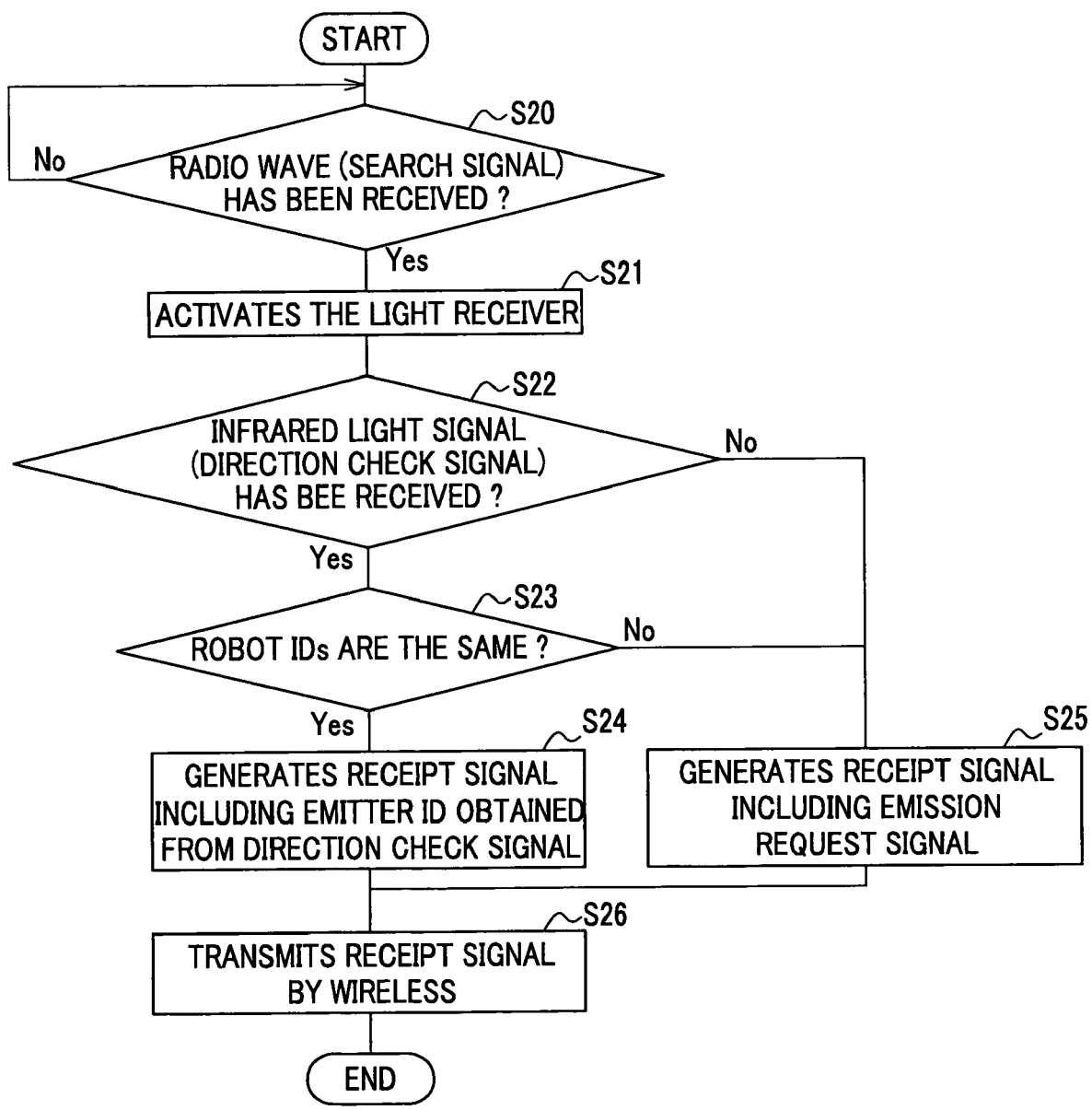

FIG. 18 is a flow chart for explaining the signal processing of the tag T1.

Figure 19:
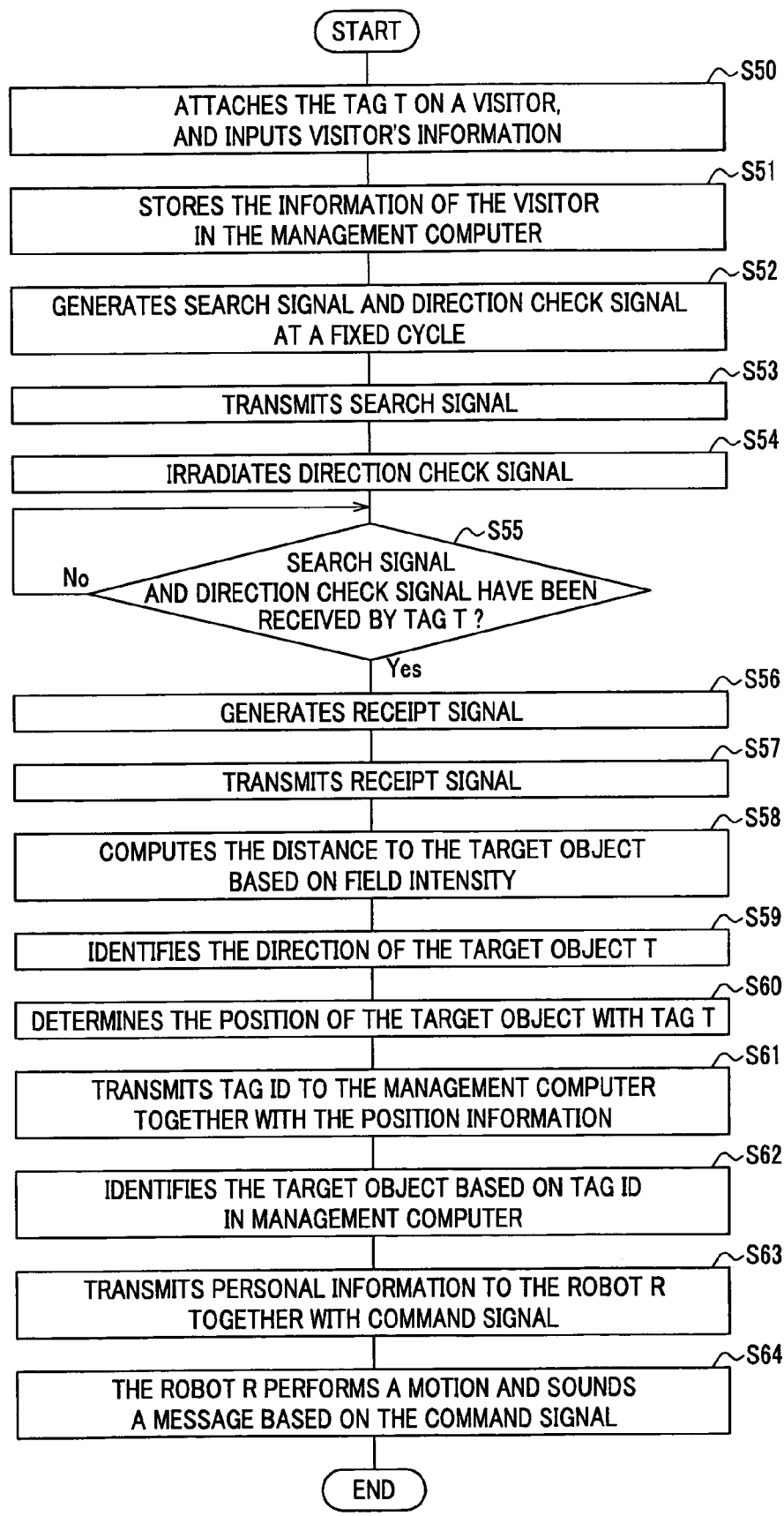

FIG. 19 is a flow chart for explaining the signal processing of the target object Detection system, which is adapted to the detection of the visitor of the office.

Figure 20A:
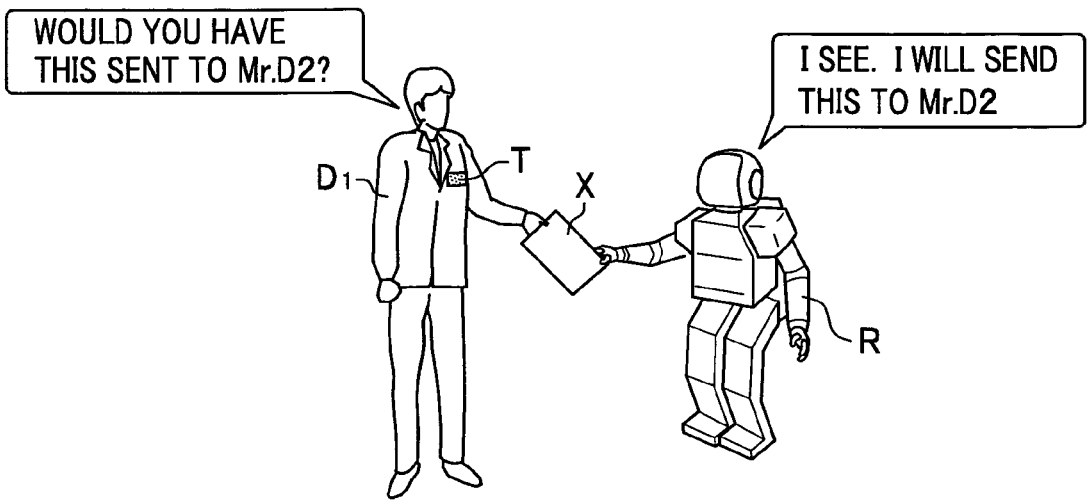

FIG. 20A is an explanatory view of the motion pattern 1 of the robot.

Figure 20B:
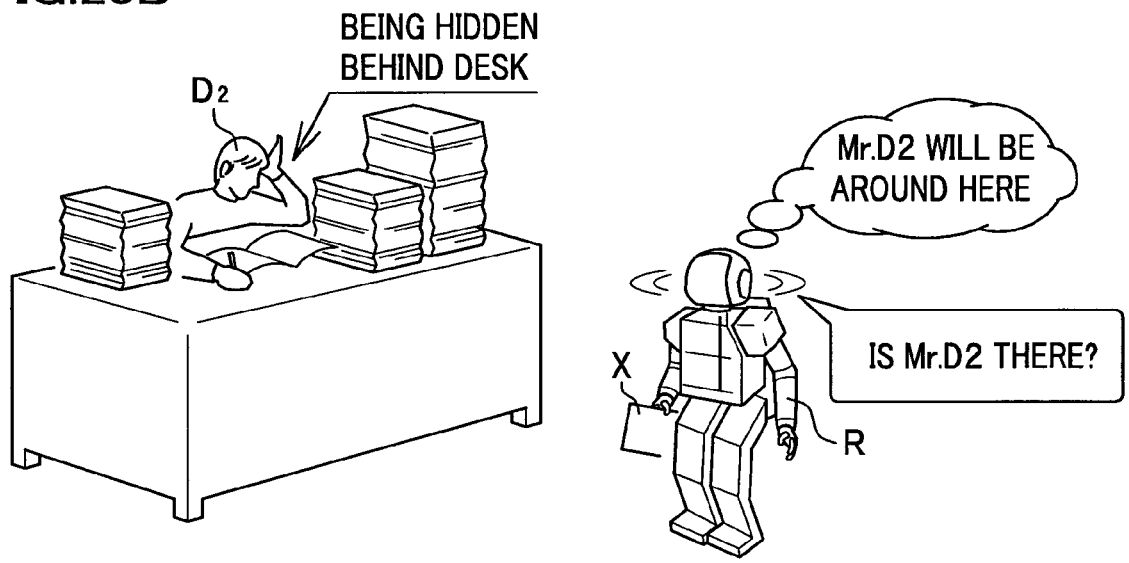

FIG. 20B is an explanatory view of the motion pattern 1 of the robot.

Figure 20C:
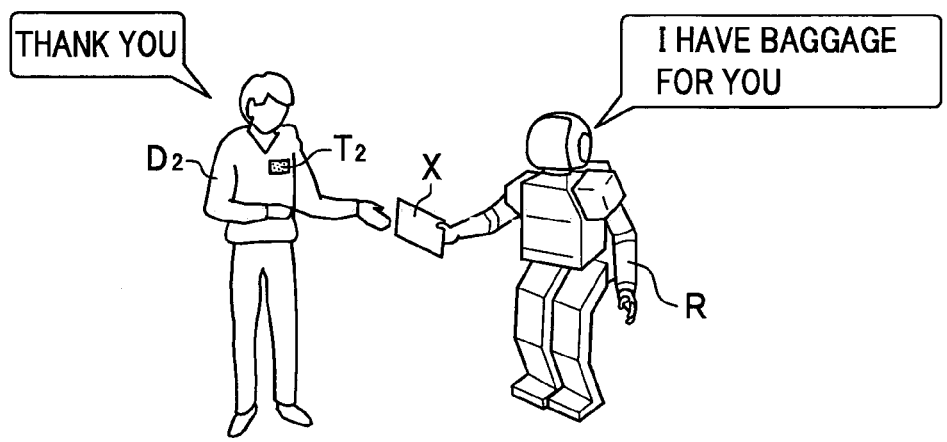

FIG. 20C is an explanatory view of the motion pattern 1 of the robot.

Figure 21:
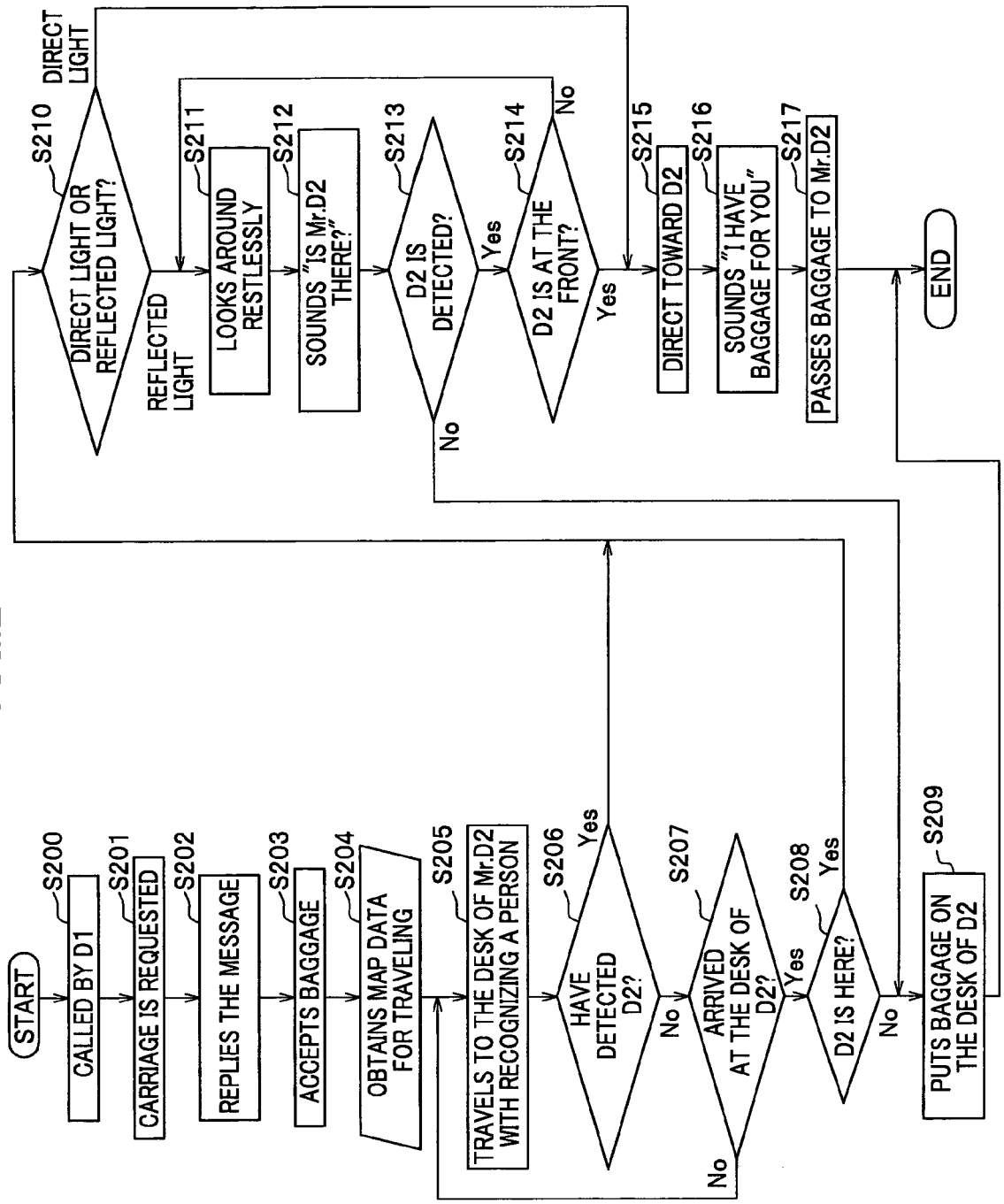

FIG. 21 is a flow chart for explaining the motion of the robot R which is under the operation of motion pattern 1.

Figure 22:
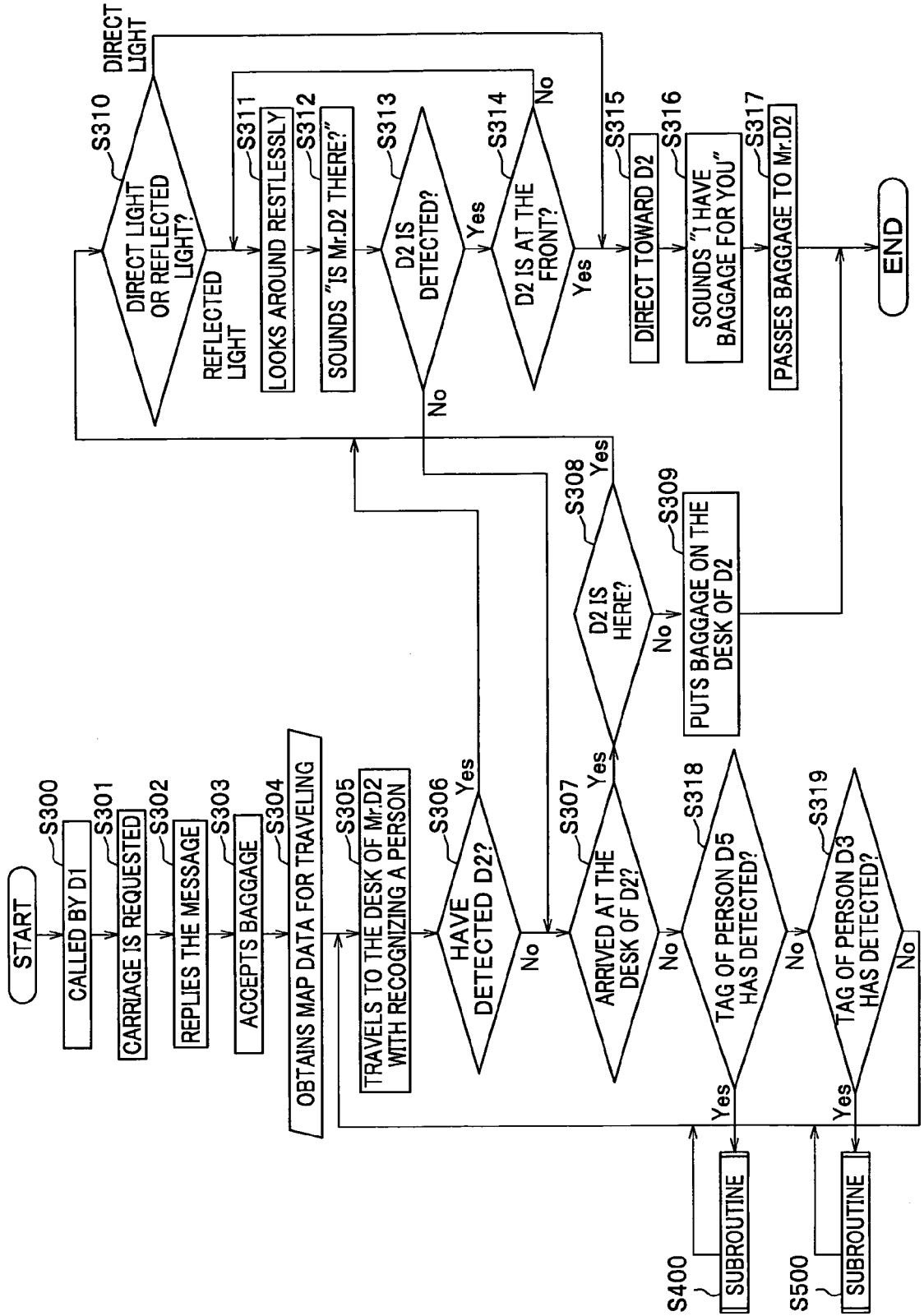

FIG. 22 is a flow chart for explaining the motion of the robot R which is under the operation of motion pattern 2.

Figure 23:
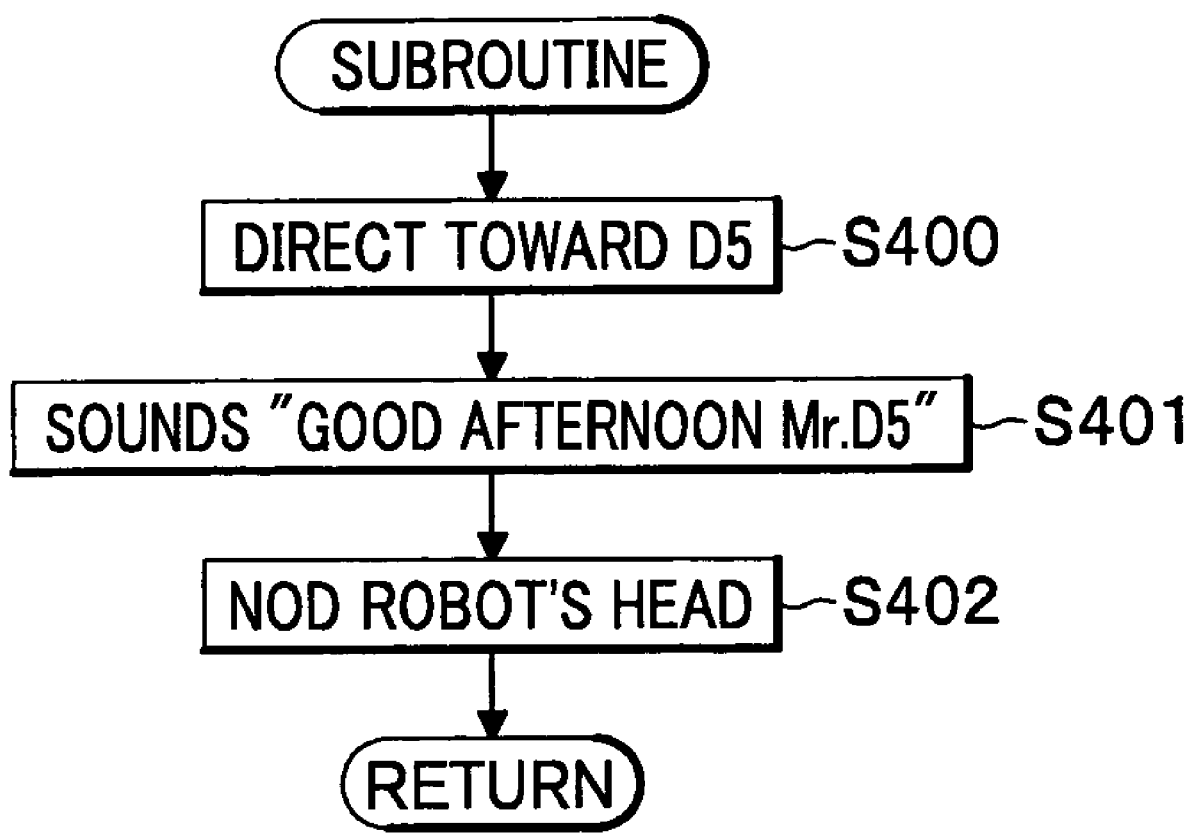

FIG. 23 is a flow chart for explaining the motion of the robot R which is under the operation of motion pattern 2.

FIG. 24 is a flow chart for explaining the motion of the robot R which is under the operation of motion pattern 2.

Figure 25A:
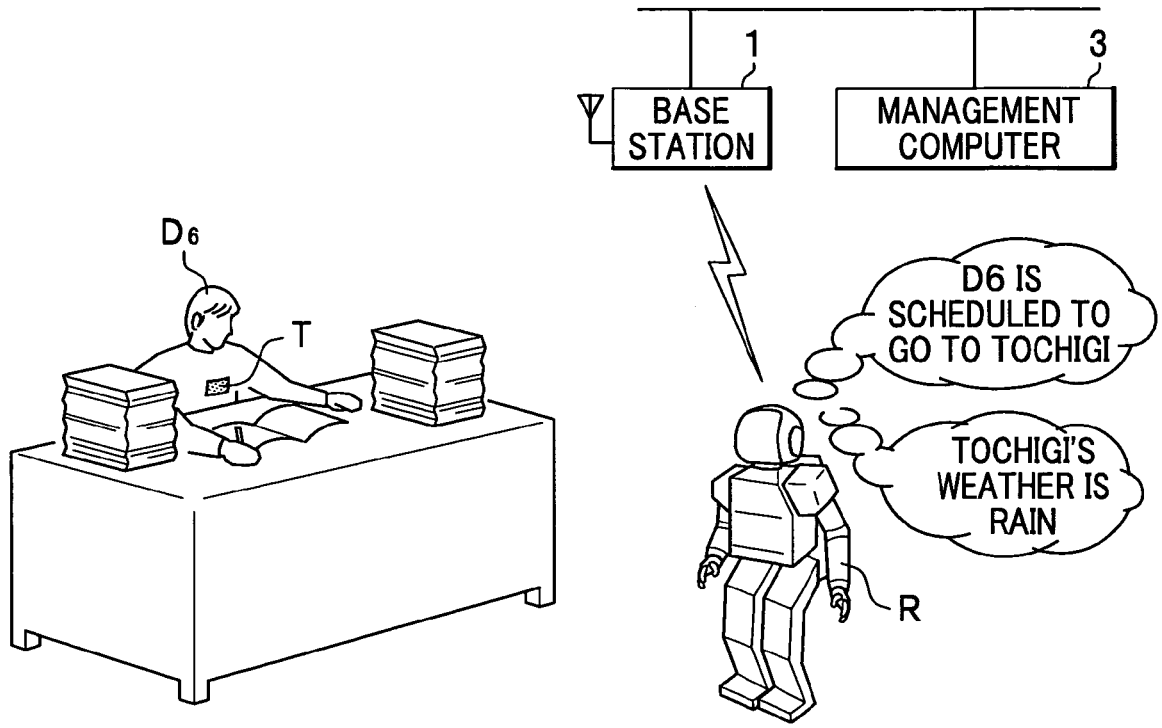

FIG. 25A is an explanatory view of the motion pattern 3 of the robot.

Figure 25B:
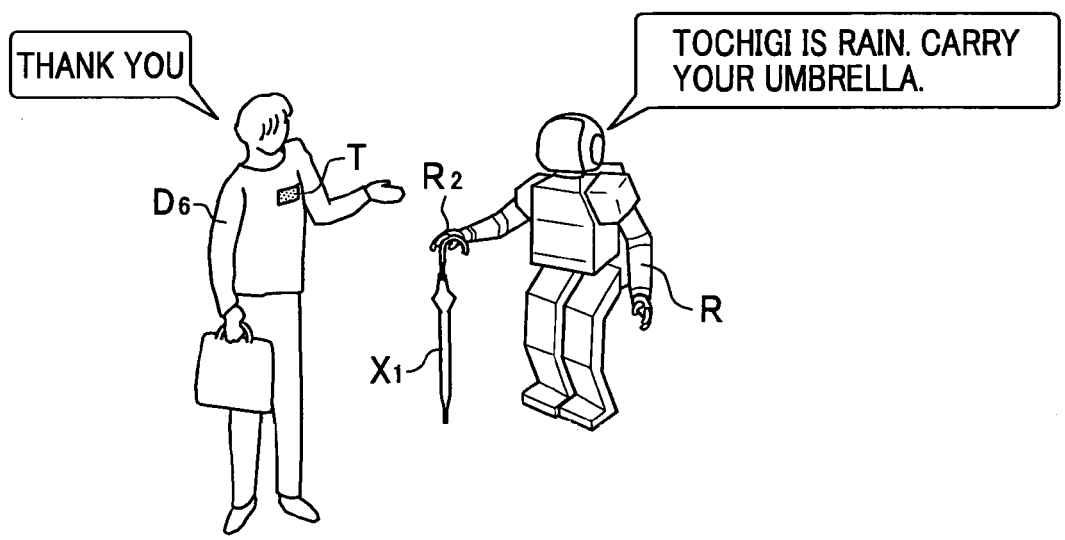

FIG. 25B is an explanatory view of the motion pattern 3 of the robot.

Figure 26:
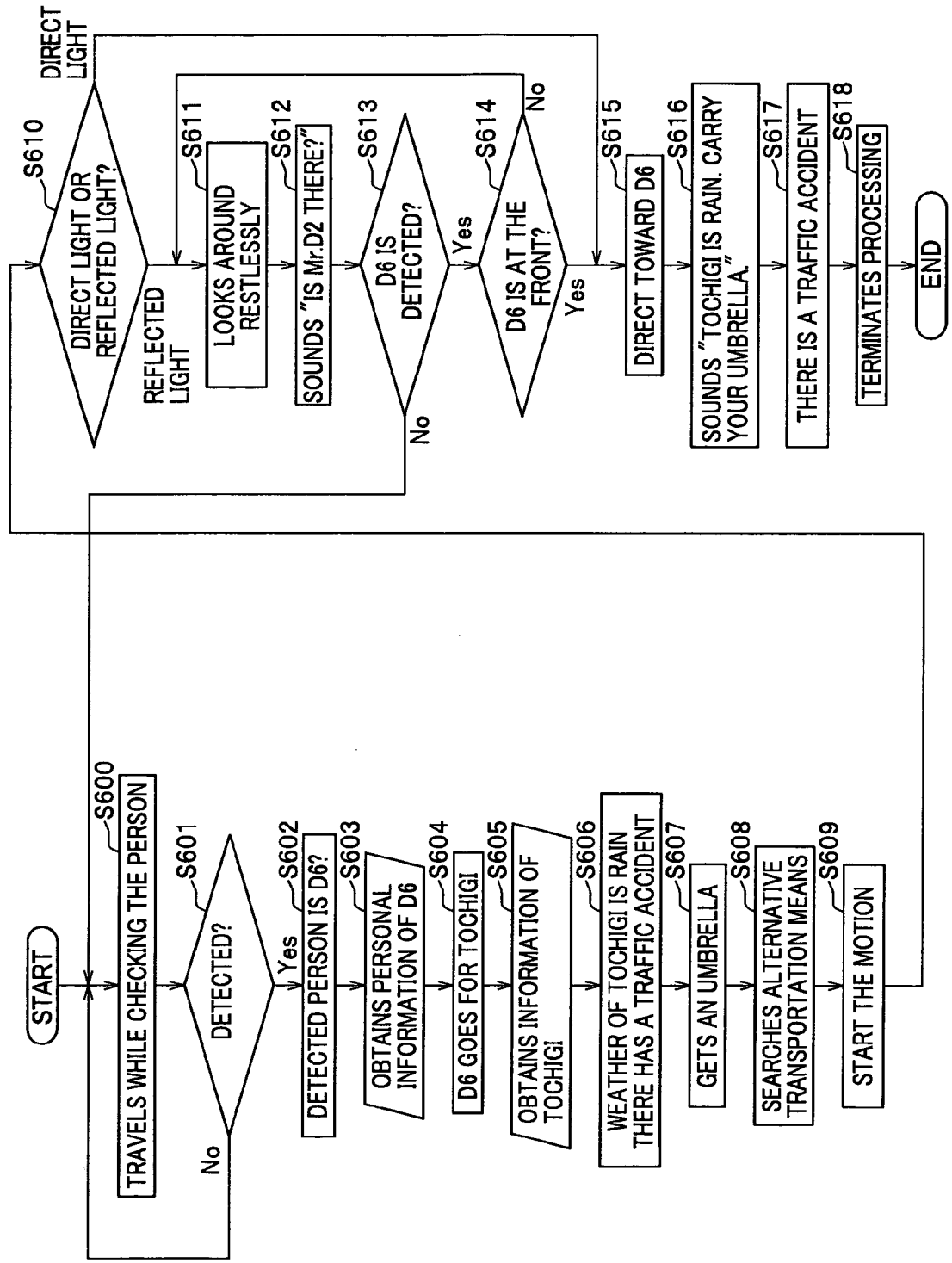

FIG. 26 is a flow chart for explaining the motion of the robot R which is under the operation of motion pattern 3.

DETAILED DESCRIPTION OF THE PREFERRED EMBODIMENT

Firstly, a mobile robot (hereinafter indicated as "robot") according to the present embodiment will be explained with reference to the attached drawings. Here, the robot of the present embodiment has a mechanism for detecting a tag provided on a target object (mobile object) and configures a mobile object detection system together with a tag.

<Construction of the Mobile Object Detection System A>

The construction of the position detection system A for detecting the mobile object will be explained with reference to FIG. 1 and FIG. 2.

The position detection system A detects a mobile object D within a surrounding area of the robot R, and identifies the position of the mobile object D if detected. The position detection system A for detecting the mobile object performs the personal recognition of the mobile object D when the position of the mobile object is identified, as necessary.

As shown in FIG. 1, the position detection system A includes a robot R, a base station 1, a management computer 3, a terminal 5, and a tag T. In this system A, the robot R communicates with the base station 1 by wireless. The base station 1 connects with the management computer 3 through a robot network 2. The management computer 3 connects with the terminal 5 through a network 4. The tag T is attached to the mobile object D. In this embodiment, the mobile object D corresponds to a person with the tag T In the position detection system A, the robot R detects the presence of the mobile object D, e.g. a person with the tag T, within a surrounding area of the robot R. Then, the robot R measures the position of the mobile object D detected, and computes the relative position (a relative vector S) with respect to the robot R of the mobile object D.

The base station 1 controls the motion of the robot R which moves throughout a controlled area C, and computes the absolute position of the robot R (a position vector p). Then, the base station 1 computes the absolute position of the mobile object D (position vector q) based on the absolute position of the robot R (a position vector p) and the relative position of the mobile object (relative vector s).

The management computer 3 performs the control of the base station 1 and controls the motion, e.g. a travel and a speech, of the robot R through the robot network 2. The management computer 3 exchanges essential information (data) with the robot R.

In this embodiment, for example, a name of a person (mobile object D) and a map (map information) of the area where the robot R moves around correspond to the essential information. The essential information is stored in a recording unit (not shown) provided in the management computer 3.

The robot network 2 connects the base station 1, the management computer 3, and the network 4 one another, and can be represented by LAN.

The terminal 5 connects with the management computer 3 through the network 4 and is used for the input and update of information, which is the information with regard to the tag T and the person with the tag T. Here, an IC tag corresponds to the tag of the present embodiment.

First Embodiment

Next, the construction of the robot R and the mobile object D (tag T) will be explained.

[Robot R]

The robot R which corresponds to the detector of the position detection system A of this embodiment is a human-shaped autonomous mobile robot which can perform a bipedal walking.

The robot R transmits radio wave W to a surrounding area of the robot R, and irradiates a light signal B (infrared light B) to search regions which are established around the robot R.

Then, the robot R computes the distance r to the mobile object D (tag T) from the robot R, based on the field strength of a receipt signal J, when a signal (receipt signal J) from the mobile object D (tag T) has been received. Here, receipt signal J is a signal which notifies the robot R that the radio wave W and light signal B transmitted (irradiated) from the robot R has been received by the mobile object D (tag T). Additionally, the robot R regards the irradiation direction of the light signal B received by the mobile object D, as the direction θ of the mobile object D. Thereby, the robot R, based on the receipt signal J, can detect the mobile object D and measure the position of the mobile object D, and computes the relative vector s (r, θ) which indicates the relative position with regard to the robot R of the mobile object D.

As shown in FIG. 1 and FIG. 2, the robot R includes a head part R1, an arm part R2, and a leg part R3, which are respectively actuated by an actuator. The robot R is adapted to perform a bipedal walking under the control of an autonomous travel controller 50 (see FIG. 2). The detail of the bipedal walking, for example, is disclosed in Japanese unexamined patent application JP2001-62760. The contents of this application are hereby incorporated by reference.

As shown in FIG. 3, the robot R includes cameras C, C, a speaker S, a microphone MC, an image processor 10, a voice processor 20, an image transmitter 30, a controller 40, an autonomous travel controller 50, a radio communication unit 60, and an object detection unit 70. The robot R further includes a gyro sensor SR1 and a GPS receiver SR2 for measuring the position of the robot R.

[Camera C]

The camera C acquires images in a form of digital format. In this embodiment, for example, a color CCD (Charge-Coupled Device) camera is adopted as the camera C. Cameras C, C are arranged in a line along a lateral direction. The image acquired by the cameras C and C are supplied to the image processor 10 and the image transmitter 30. In this embodiment, the cameras C, C, the speaker S, and the microphone MC are installed within the head part R1 of the robot R.

[Image Processor 10]

The image processor 10 performs recognition of a person and an obstacle in the surrounding area, in order to recognize the condition of the surrounding area of the robot R based on the image acquired by the cameras C, C. This image processor 10 includes a stereoscopic processor 11a, a mobile object extracting unit 11b, and a face recognition unit 11c.

The stereoscopic processor 11a performs a pattern matching between images obtained from each camera C on the basis of one of two images acquired by the cameras C, C. In this embodiment, since the robot R has two cameras (a left-side camera and a right-side camera), one of two images is the image obtained from left-side camera and the other of two images is the image obtained from right-side camera. Thus, the pattern patching is performed between the image obtained from left-side camera and the image obtained from right-side camera.

Then the stereoscopic processor 11a computes a parallax between two images to generate a parallax image, and outputs a parallax image to the mobile object extracting unit 11b together with the image entered from the cameras C and C. Here, the computing of the parallax is performed between corresponding pixels in two images. In the parallax image, the distance from the robot R (camera C) to the target object is indicated by the difference of the brightness.

The mobile object extracting unit 11b extracts a mobile (moving) object from the image obtained by the camera C, based on data entered from the stereoscopic processor 11a. The reason why the extraction of the mobile object is performed is to perform the recognition of a person on the assumption that it is more likely that the moving object is a person.

The mobile object extracting unit 11b performs the pattern matching in order to extract the mobile object, and computes a distance for corresponding pixels in two images to generate a distance image. Here, the pattern matching is performed by comparing the current frame (image), which was obtained currently by the camera C, with the last frame (image), which is generated from several frames obtained prior to the acquisition of the current frame.

Then, the mobile object extracting unit 11b, based on the distance image and the parallax image, searches the pixels whose shift amount is large, from among the pixels within a predetermined distance from the cameras C, C (robot R). If such pixel exists, the mobile object extracting unit 11b considers that a person is within the pixels (distance), and extracts a mobile object from the image entered from the camera based on the distance image and the parallax image.

The face recognition unit 11c extracts a human body color region from the extracted mobile object, and computes position of the face of a human in consideration of a size and shape of the extracted human body color region. The position of a hand is also computed by the same method.

The position of the recognized face is supplied to the controller 40 for communicating with a person and for actuating the robot R. Additionally, the position of the recognized face is supplied to the radio communication unit 60 in order to supply to the management computer 3 through the base station 1.

[Voice Processor 20]

The voice processor 20 includes a voice synthesizer 21a and a voice recognizer 21b.

The voice synthesizer 21a generates voice data from text information based on a command, which commands the robot R to have a conversation with a human or to sound a voice message and which is entered from the controller 40. Then, the voice synthesizer 21a outputs voice data to the speaker S. Here, the generation of voice data is, for example, performed by utilizing the correspondence between voice data and text information stored beforehand in a recording unit (not shown)

The voice recognizer 21b generates text information from voice (sound) data, based on the correspondence between voice data and text information stored beforehand in the recording unit (not shown). Then, the voice recognizer 21b outputs text data to the controller 40.

The image transmitter 30 outputs image data entered from the camera C, C to the management computer 3 through the radio communication unit 60.

[Autonomous Travel Controller 50]

The autonomous travel controller 50 includes a head controller 51a, an arm controller 51b, and a leg controller 51c.

The head controller 51a actuates the head part R1 based on a command entered from the controller 40. The arm controller 51b actuates the arm part R2 based on a command entered from the controller 40. The leg controller 51c actuates a leg part R3 based on a command entered from the controller 40.

[Robot Position Measurement Unit]

The gyro sensor SR1 and GPS receiver SR2 served as a robot position measurement unit for computing the position of the robot R.

In this embodiment, the robot position measurement unit measures the absolute position (a position vector p(x, y)) within the controlled area C of the robot R, and an angle □ of the robot R. Additionally, data obtained by the gyro sensor SR1 and the GPS receiver SR2 is supplied to the controller 40, and is used for deciding the motion of the robot R. Also, the same data is supplied to the management computer 3 through the radio communication unit 60. Here, angle □ indicates which direction the robot R is directed to within the controlled area C.

[Radio Communication Unit 60]

The radio communication unit 60 exchanges data with the management computer 3. The radio communication unit 60 includes a public line communication unit 61a and a radio communication unit 61b.

Here, the relative vector s (object position information) the position vector p and angle □ of the robot R (robot position information), an identification number of tag (tag ID), and a command for the robot R correspond to the data (information) to be exchanged.

The public line communication unit 61a performs a wireless communication by using a cellular phone line or a personal handyphone system. The radio communication unit 61b performs a wireless communication by using a short-range wireless communication technique, e.g. a wireless local area network complying with IEEE802.11b standard.

The radio communication unit 60 performs a data exchange with the management computer 3 using one of the public line communication unit 61a and the radio communication unit 61b, when a signal which commands the robot R to communicate with the management computer 3 is entered from the management computer 3.

[Target Detection Unit 70]

The object detection unit 70 detects a presence of the mobile object D with the tag T within a surrounding area of the robot R, and computes the position of the mobile object D when the mobile object D is detected. In this occasion, the object detection unit 70 computes the relative vector s which indicates the relative location between the robot R and the mobile robot R.

As shown in FIG. 4, the object detection unit 70 includes a unit controller 80, a radio transmitter-receiver 90, a light emission unit 100, and a recording unit 110.

(Unit Controller 80)

The unit controller 80 generates a search signal F to be transmitted from the radio transmitter-receiver 90, and a direction check signal H which is emitted as an infrared light B from the light emission unit 100.

The unit controller 80, additionally, determines the position of the mobile object D based on a receipt signal J, which is transferred from the tag T when the tag T has received the search signal F, and the unit controller 80 computes the object position information (relative vector s).

Here, the search signal F is a signal to be used for checking whether or not the mobile object D exists in the surrounding area of the robot R, and the direction check signal H is a signal to be used for checking which direction with respect to the robot R the mobile object D exists in. The receipt signal J is a signal which indicates that the tag T has received at least the search signal F.

The unit controller 80 includes a data processor 81, an encryption unit 82, a time division unit 83, a decoder 84, and a field intensity measuring unit 85.

The data processor 81 generates the search signal F and the direction check signal H, and determines the position of the mobile object D and computes the object position information (relative vector s) from the receipt signal J.

The data processor 81 includes a signal generator 81a and a position computing part 81b.

(Signal Generator 81a)

The signal generator 81a obtains a unique identification number of the robot R (robot ID) from the recording unit 110 at a predetermined cycle or when a signal (a transmission request signal), which requests the transmission of radio wave, is entered from the controller 40. Here, the robot ID is a unique identification number of the robot R, in which the object detection unit 70 is installed.

Then the signal generator 81a generates a search signal F which includes the robot ID and receipt request signal. Here, the receipt request signal is a signal which commands the mobile object D (tag T) to generate the receipt signal J when the mobile object D (tag T) receives the search signal F.

The signal generator 81a generates the direction check signal H, which is emitted as an infrared light signal from the light emission unit 100, when the search signal F is generated.

The direction check signal H is generated for each light emitter (LED 1 to LED 8) of the light emission unit 100, separately, and includes the robot ID and an emitter ID, which is a unique identification number for identifying the light emitter. In this embodiment, this direction check signal H is also generated, when the receipt signal entered from the decoder 84 includes an emission request signal.

Here, the emitter ID is information (direction information) for identifying the direction of the mobile object D.

In the present embodiment, since a total of eight light emitters are provided on the robot R, the data processor 81 generates a total of eight direction check signal H, which includes a robot ID and the emitter ID.

For example, if it is assumed that the robot ID is "02" (robot ID=02) and that the emitter ID of light emitters (from LED1 to LED8) is from "θ1" to "θ8", the direction check signal to be generated for the light emitter LED1 includes the robot ID whose ID is "02" and the emitter ID whose ID is "θ1". Additionally, the direction check signal to be generated for the light emitter LED2 includes the robot ID whose ID is "02" and the emitter ID whose ID is "θ2".

Then, the signal generator 81a outputs the direction check signal H and the search signal F to the encryption unit 82.

Here, the position computing part 81b of data processor 81 measures the position of the mobile object D based on the receipt signal J transmitted from the tag T which has received the search signal F. The detailed explanation of the signal processing in the position computing part 81b will be made later together with the signal processing in the field intensity measuring unit 85 and the decoder 84.

(Encryption Unit 82)

The encryption unit 82 outputs the encrypted search signal Fc, which is obtained by the encryption of the search signal F, to the radio transmitter-receiver 90, when the search signal F is entered from the data processor 81. Thereby, the encrypted search signal Fc is modulated and is transmitted from the radio transmitter-receiver 90.

The encryption unit 82 encrypts the direction check signal H entered from the data processor 81 to obtain the encrypted direction check signal Hc, and outputs the encrypted direction check signal Hc to the time division unit 83.

In this embodiment, the direction check signal H is generated to each light emitter of the light emission unit 100.

As shown in FIG. 3, since the light emission unit 100 has a total of eight light emitters, a total of eight direction check signals are generated in the encryption unit 82 and are entered to the time division unit 83.

(Time Division Unit 83)

The time division unit 83 determines the order of the emission of light emitters (LED1-LED8) of the light emission unit 100, and the timing of the emission of each light emitter (LED 1-LED 8).

To be more specific, the time division unit 83 determines the order and timing of the emission of each light emitter (LED 1-LED 8) when the encrypted direction check signal Hc is entered from the encryption unit 82. Then, the time division unit 83 outputs the encrypted direction check signal Hc to the light emission unit 100 based on the order and timing which were determined.

For example, if it is determined that each light emitter is emitted at 0.5 sec interval in order of the light emitter LED1, the light emitter LED4, the light emitter LED7, the light emitter LED2, the light emitter LED5, the light emitter LED8, the light emitter LED3, and the light emitter LED6, the time division unit 83 outputs the encrypted direction check signal Hc, at 0.5 sec interval, to the modulator of each light emitter (LED1-LED 8). That is, the time division unit 83 outputs the encrypted direction check signal Hc, at 0.5 sec interval, in order of: the modulator of the light emitter LED 1; the modulator of the light emitter LED 4; the modulator of the light emitter LED 7; the modulator of the light emitter LED 2; the modulator of the light emitter LED 5; the modulator of the light emitter LED 8; the modulator of the light emitter LED 3; the modulator of the light emitter LED 6.

In this embodiment, a total of eight encrypted direction check signals are entered to the time division unit 83, and the light emitter to which each encrypted direction check signal is supplied is determined beforehand in the data processor 81.

The time division unit 83, therefore, checks the emitter ID included in the encrypted direction check signal Hc when the encrypted direction check signal Hc is entered, and outputs the encrypted direction check signal Hc to the modulator of the light emitter, which is specified by the emitter ID, at the determined order and timing.

For example, if the emitter ID of light emitter (LED1-LED8) is from $\theta_1$ to $\theta_8$, the time division unit 83 supplies the encrypted direction check signal Hc, which includes emitter ID="$\theta_1$", to the modulator of the light emitter whose emitter ID is "$\theta_1$". Additionally, the time division unit 83 supplies the encrypted direction check signal Hc, which includes emitter ID="$\theta_2$", to the modulator of the light emitter whose emitter ID is "$\theta_2$".

(Light Emission Unit 100)

The light emission unit 100 emits a light to search regions, which are established around the robot R based on the position of the robot R.

Referring to FIGS. 4 and 5A, the light emission unit 100 includes a plurality of light emitters (LED1-LED8) and modulators provided to each light emitter.

The modulator modulates the encrypted direction check signal Hc entered from the time division unit 83 to obtain a modulated signal.

The light emitter emits the modulated signal as an infrared light signal (infrared light) to the predetermined search region.

In this embodiment, the surrounding area of the robot R is divided into a plurality of search regions in order to determine the position (direction) of the mobile object D (see FIG. 5A). The robot R is provided with light emitting diodes, each served as the light emitter for emitting infrared light to the search region and each is directed to the specific search region. Here, one light emitting diode is directed to one search region.

To be more precise, in the case of FIG. 5A, a total of eight search regions (from first region to eighth region) are established around the robot R. That is, the robot R is provided with a total of eight search regions in 360-degree directions of the robot R.

In other words, the fan-shaped search regions (from first region to eighth region) are established around the robot R so that the robot R is surrounded by fan-shaped search regions. The robot R is positioned at the center of the region formed by these fan-shaped search regions (from first region to eighth region).

Therefore, in the case of FIG. 5A, a total of eight light emitters are provided around the head part R1 of the robot R so that the infrared light is surely emitted toward each search region.

As can be seen from FIG. 5A, the search regions (from first region to third region) which are provided in front of the robot R are narrower than the remainders of search regions (from fourth region to eighth region). To be more precise, the angular range ($\lambda a+\alpha$) of the search regions (from first region to third region) and the angular range ($\lambda b+\alpha$) of the search regions (from fourth region to eighth region) satisfy the following relation. That is, $\lambda b+\alpha > \lambda a+\alpha$.

This is because of the following reason. That is, when the robot R detects the presence of the mobile object D and directs the face of the robot R to the detected mobile object D, if the direction of the face of the robot R does not agree with the direction of the mobile object D, the mobile object D (person) may feel that the robot R is not directing his face toward the mobile object D.

For preventing the occurrence of such situation, it is preferable to increase the number of search regions, but is not necessarily to increase the number of the search regions along 360-degree direction. The occurrence of such situation can be prevented by only increasing the numbers of the search regions which are positioning in front of the robot R. By adopting this manner, the position detection in the front-side of the robot R can be achieved with accuracy and the numbers of the light emitter can be curbed.

Therefore, in this embodiment, the position detection with sufficient accuracy of the mobile object D within each search region (from first region to the third region) is enabled, by narrowing the irradiation range of an infrared light with respect to respective search regions which are located in front of the robot R.

Thus, the position detection of the person can be achieved with accuracy, if the mobile object D is a person and an image pickup of a face image of the person is performed by cameras C, C of the robot R. In this case, the cameras C, C of the robot R can be directed to the face of the person as the mobile object D. Since the result of the position detection can reflect on the motion control of the robot R and the adjustment of an angle of cameras C, C, the cameras C, C of the robot R can be directed to the face of the person as the mobile object D.

In this embodiment, additionally, in order to minimize the region excluded from the search region, i.e. to minimize a dead space in the surrounding area, the range of the search region is determined so that adjoining search regions overlap each other at edge (See FIG. 5A).

In this embodiment, the output order and timing of the encrypted direction check signal Hc from the time division unit 83 of the unit controller 80 is adjusted. This is because it is required to prevent the occurrence of an interference of an infrared light that is caused when an infrared light is irradiated to the adjoining search regions consecutively.

Referring to FIG. 6, in this embodiment, the time division unit 83 adjusts the output order and timing of the encrypted direction check signal Hc (Hc1-Hc8) so that the irradiation of the infrared light is performed in order of: the first region (symbol Sa1 in figure); the fourth region (symbol Sa4 in figure); the seventh region (symbol Sa7 in figure); the second region (symbol Sa2 in figure); the fifth region (symbol Sa5 in figure); the eighth region (symbol Sa8 in figure); the third region (symbol Sa3 in figure); and the sixth region (symbol Sa6 in figure).

In this embodiment, as shown in FIG. 5B, an irradiation range in a height direction of an infrared light is determined so that the presence of a person, e.g. a person from a child to an adult, can be detected at a distance X. Here, distance X is determined based on an average distance wherein interpersonal communication is available. Thus, distance X is a distance from a robot R wherein an inter-communication between the robot R and a person can be achieved.

To be more precise, an irradiation range in a height direction of an infrared light is determined so that a height Y which corresponds to an average height of a breast of the adult person, and a height Z which corresponds to an average height of a breast of a child are surely irradiated by an infrared light. In this case, an irradiation angle in a height direction of the infrared light is denoted by W.

(Radio Transmitter-Receiver 90)

The radio transmitter-receiver 90 transmits radio wave W toward a surrounding area of the robot R, and receives a receipt signal J transmitted from the mobile object D which has received the radio wave W.

The radio transmitter-receiver 90 includes a modulator 91, a demodulator 92, and a transceiver antenna 93.

The modulator 91 modulates the encrypted search signal Fc, which is entered from the data processor 81, to generate a modulated signal, and transmits the modulated signal through the transceiver antenna 93.

The demodulator 92 receives the modulated signal transmitted by wireless from the tag T of the mobile object D, and obtains the encrypted receipt signal Jc by demodulating the modulated signal.

Then, the demodulator 92 outputs the encrypted receipt signal Jc to the decoder 84 and the field intensity measuring unit 85 of the unit controller 80.

(Decoder 84)

The decoder 84 obtains the receipt signal J by decoding the encrypted receipt signal Jc, which was generated by coding the receipt signal J.

In this embodiment, since the receipt signal J includes at least the emitter ID, the robot ID, and a tag ID, the decoder 84 outputs these IDs to the data processor 81. Here, the tag ID is a unique identification number for identifying the tag which has transmitted the receipt signal. Additionally, if the receipt signal J includes the emission request signal, the decoder 84 also outputs the emission request signal to the data processor 81.

(Field Intensity Measuring Unit 85)

The field intensity measuring unit 85 measures an intensity of the modulated signal, when the modulated signal transmitted from the tag T of the mobile object D is received by the radio transmitter-receiver 90.

To be more precise, the field intensity measuring unit 85 detects a power of the encrypted receipt signal Jc, which is entered from the demodulator 92 of the radio transmitter-receiver 90, and computes an average of the detected power. Then, the field intensity measuring unit 85 outputs the computed average value, as the data of the field intensity, to the data processor 81.

The position computing part 81b of the data processor 81b determines the position of the mobile object D, and computes the object position information (relative vector s).

To be more specific, the position computing part 81b computes the distance r to the mobile object D from the robot R based on the field intensity of the modulated signal, which is received in the radio transmitter-receiver 90 and is transmitted from the tag T of the mobile object D.

The position computing part 81b, additionally, refers to the emitter ID included in the receipt signal J, and identifies the light emitter which has emitted an infrared light received by the mobile object D based on the emitter ID. Then, the position computing part 81b regards the direction of the search region to which the light emitter identified by the emitter ID has irradiated an infrared light, as the direction of the mobile object D. Thereby, the position (direction) of the mobile object D can be identified from this direction and the distance r.

In this embodiment, the position computing part 81b firstly obtains the robot ID from the receipt signal J entered from the decoder 84. Then, the position computing part 81b compares the obtained robot ID with the robot ID stored in the recording unit 110. If both robot IDs are the same, the position computing part 81b starts the position detection and computing of object position information (relative vector).

In this embodiment, as shown in FIG. 7, the surrounding area of the robot R is divided into four areas depending on the distance from the robot R. That is, a first area, a second area, a third area, and a fourth area are established around the robot R.

In this embodiment, each area is beforehand correlated with the field intensity on the basis of a value of field intensity, and a table (a distance table) which indicates the correlation between the area and the field intensity is stored in the recording unit 110.

Therefore, the position computing part 81b refers to the distance table based on the field intensity entered from the field intensity measuring unit 85, and obtains distance information (distance r) which indicates which area among areas (from first area to fourth area) the mobile object D, which has the tag T that has transmitted the receipt signal J, exists in.

Here, for example, if the field intensity α entered from the field intensity measuring unit 85 is between threshold values γ and β (here, γ is a lower limit of the third area and β is an upper limit of the third area), the position computing part 81b obtains the distance information which indicates the third area.

The position computing part 81b refers to the emitter ID included in the receipt signal J entered from the decoder 84, and identifies the light emitter which has emitted an infrared light received by the mobile object D based on the emitter ID. Then, the position computing part 81b obtains information (direction information) which indicates the irradiation direction of the infrared light from the identified light emitter.

In this embodiment, as shown in FIG. 8, a total of eight search regions (from first region to eighth region) are established in the surrounding area of the robot R, and the recording unit 110 stores a table (a direction table) which indicates the search region to which each light emitter is being directed.

Therefore, the data processor 81 refers to the direction table stored in the recording unit 110 based on the emitter ID, and recognizes the search region to which the light emitter identified by the emitter ID has irradiated an infrared light. That is, the search region to which infrared light has been irradiated is determined from among predetermined search regions (from first region to eighth region).

Then, the data processor 81 obtains information indicating the identified search region as the information (direction information) which indicates the direction of the mobile object D.

In this embodiment, adjoining search regions overlap each other at edge, but the overlapping edge of each search region is omitted from this FIG. 8. This omission of the overlapping edge is the same as FIG. 8.

The position computing part 81b basically-generates information (position information), which indicates the position of the mobile object D, from distance information and direction information. In this occasion, the position computing part 81b computes the relative vector s which indicates the relative location between the robot R and the mobile object D, and the position computing part 81b generates the object position information including at least the relative vector s from position information and relative vector s.

Here, the explanation of object position information which has generated will be made, with reference to FIG. 9. FIG. 9 corresponds to a figure which is formed by the overlay of FIG. 7 and FIG. 8.

If the content of distance information is "THIRD AREA" and the content of direction information is "SECOND REGION", the data processor 81 regards the overlapping area between "THIRD AREA" and "SECOND REGION" as the position of the mobile object D, and generates information (object position information) which indicates this overlapping area. Here, in FIG. 9 this overlapping area is denoted by a symbol P1.

As described above, the positional relation between the robot R and the mobile object D is determined based on the intensity of the receipt signal J which has received by the robot R, and on the direction information which is identified by the emitter ID included in the receipt signal J. In other words, the direction and distance of the mobile object D is computed on the basis of the position of the robot R, and the position of the mobile object D can be determined.

In this embodiment, as described above, the position computing part 81b generates information indicating the relative position with regard to the robot R of the mobile object D from distance information and direction information. Hereinafter, this information is also indicated as "object position information s(r, θ)".

The position computing part 81b outputs the object position information to the controller 40 of the robot R together with the tag ID included in the receipt signal J entered from the decoder 84.

Then, the controller 40 transmits the tag ID, object position information s(r, θ), and robot position information [p (x, y), angleφ] to the management computer 3 through the radio communication unit 60. Here, the robot position information indicates the absolute position within the controlled area C of the robot R.

Thereby, the management computer 3 refers to the recording unit (not shown) based on the tag ID when the tag ID is transferred from the robot R, and obtains information being correlated with the tag ID to perform the identification of the mobile object D with tag T. Then, the management computer 3 outputs the obtained information to the robot R together with a command signal which commands the robot R to make a predetermined motion.

Thus, the controller 40 of the robot R controls each section, e.g. the autonomous travel controller 50, of the robot R based on the command signal.

For example, the controller 40 of the robot R determines the motion of the robot R, such as an autonomous travel of the robot R to the front of the mobile object D or an image pickup of the face image of the mobile object D by adjusting an angle and direction of the camera C.

When the emission request signal is included in the receipt signal J, the signal generator 81a generates the direction check signal H and outputs the direction check signal H to the encryption unit 82. Thereby, an infrared light is emitted from each light emitter of the light emission unit 100.

[Tag T]

The tag T receives radio wave W and a light signal B which are transferred from the robot R, and returns the receipt signal J, which indicates the receipt of the radio wave W or a light signal B, to the robot R.

In this embodiment, because a person who has a tag T corresponds to the mobile object D, radio wave W and a light signal B from the robot R is received by the tag T. Therefore, the explanation of the tag T will be made as follows.

As shown in FIG. 10, the tag T includes a radio transceiver 140, a light receiver 150, a receipt signal generator 160, a storage 170.

(Radio Transceiver 140)

The radio transceiver 140 receives the modulated signal transferred by wireless from the robot R, and transmits by wireless the modulated signal, which is obtained by modulating the receipt signal J entered from the receipt signal generator 160, to the robot R.

The radio transceiver 140 includes an antenna 141, a demodulator 142, and a modulator 143.

The demodulator 142 demodulates the modulated signal, which is transferred from the robot R and is received through the antenna 141, to obtain the encrypted search signal Fc. Then, the demodulator 142 outputs the encrypted search signal Fc to the receipt signal generator 160.

The modulator 143 modulates the encrypted receipt signal Jc, which is entered from an encryption unit 163 of the receipt signal generator 160, to obtain a modulated signal. Then, the modulator 143 transmits the modulated signal to the robot R by wireless through the antenna 141.

(Light Receiver 150)

The light receiver 150 receives the infrared light irradiated from the robot R.

The light receiver 150 includes an optical receiver 151 and a light demodulator 152.

The optical receiver 151 receives directly the infrared light (a infrared light signal) irradiated from the robot R. The light demodulator 152 demodulates the infrared light signal received by the optical receiver 151 to obtain the encrypted direction check signal Hc.

To be more specific, when infrared light signal is received by the optical receiver 151, the light receiver 150 demodulates the infrared light signal to obtain the encrypted direction check signal Hc. Then, the light receiver 150 outputs the encrypted direction check signal Hc to the receipt signal generator 160.

(Receipt Signal Generator 160)

The receipt signal generator 160 generates a signal (receipt signal J), which indicates the receipt of the search signal F from the robot R.

In this embodiment, this receipt signal J is generated in response to the receipt request signal included in the search signal F, when the search signal F (modulated signal) transferred from the robot R is received by the radio transceiver 140.

As shown in FIG. 10, the receipt signal generator 160 includes a decoder unit 161, a processor unit 162, and the encryption unit 163.

The decoder unit 161 decodes the encrypted signal to obtain the signal. That is, the decoder unit 161 decodes the encrypted search signal Fc, which is entered from the radio transceiver 140, and the encrypted direction check signal Hc, which is entered from the light receiver 150, to obtain the search signal F and the direction check signal H, respectively. Then, the decoder unit 161 outputs the search signal F and the direction check signal H to the processor unit 162.

The processor unit 162 generates the receipt signal J. In this embodiment, the search signal F includes the robot ID and the receipt request signal. Here, the robot ID is a unique identification number to specify the robot R which has transmitted the search signal F. The receipt request signal is a signal which commands the mobile object D to perform the predetermined processing when the mobile object D has received the search signal F.

The direction check signal H includes the robot ID for identifying the robot R which has emitted the direction check signal H, and the emitter ID for identifying the light emitter which has emitted the direction check signal H.

Thus, the processor unit 162 changes the condition of the light receiver 150 from a standby condition to an activated condition in response to the receipt request signal included in the search signal F, when the search signal F is entered to the processor unit 162.

When the processor unit 162 receives the direction check signal H within a predetermined time after activating the light receiver 150, the processor unit 162 compares the robot ID included in the direction check signal H with the robot ID included in the search signal F.

The processor unit 162 obtains a unique identification number (tag ID) being assigned to the tag T from the storage 170, when the robot ID, which is included in the direction check signal H, agrees with the robot ID, which is included in the search signal F.

Then, the processor unit 162 generates the receipt signal J in which the tag ID, the robot ID included in the search signal F, and the emitter ID included in the direction check signal H are included, and outputs the generated receipt signal J to the encryption unit 163.

On the contrary, the processor unit 162 generates the receipt signal J which further includes the emission request signal therein, if the direction check signal H is not entered within a predetermined time after activating the light receiver 150 or if the robot ID of the direction check signal H disagrees with the robot ID of the search signal F. Then, the processor unit 162 outputs the generated receipt signal J to the encryption unit 163. Here, the emission request signal is a signal which commands the robot R (detection unit) to emit an infrared light.

The encryption unit 163 encrypts the receipt signal J to generate the encrypted receipt signal Jc, and outputs the encrypted receipt signal Jc to the radio transceiver 140.

Thereby, the encrypted receipt signal Jc is modulated in the modulator 143 of the radio transceiver 140 and then transferred by wireless through the antenna 141.

[Base Station 1]

As shown in FIG. 11, the base station 1 includes the management computer 3, a mobile object database 210, a map database 220, and a data storage unit 230. The mobile object database 210 stores attribute-information of the mobile object D. The map database 220 stores map information (data) of the controlled area C. The data storage unit 230 stores position information of the mobile object D which is correlated with attribute-information of the mobile object D.

(Management Computer 3)

The management computer 3 includes a transceiver 240, a tag ID collator 250, a position calculator 260, and a robot manager 270. The management computer 3 performs a processing of information (object position information, robot position information, etc.) which is exchanged between the radio communication unit 60 of the robot R and the management computer 3.

The transceiver 240 receives data transferred from the radio communication unit 60 of the robot R through a receiver 242, and outputs data to the tag ID collator 250 and the position calculator 260. Here, the data from the robot R includes the tag ID, object position information s (r, θ), and robot position information [p(x, y), angleφ].

The transceiver 240 transmits the command signal to the radio communication unit 60 of the robot R through a transmitter 243, when the command signal (or program) for actuating the robot R is entered from the robot manager 270.

The tag ID collator 250 obtains the tag ID from data signal entered from the receiver 242, and refers to the mobile object database 210 based on the tag ID. Then, the tag ID collator 250 obtains attribute-information being correlated with the tag ID to perform a personal identification of the mobile object D identified by the tag ID.

The position calculator 260 computes the absolute position within the controlled area C of the mobile object D based on object position information s (r, θ) and robot position information [p(x, y), angleφ], which are entered from the receiver 242. In other words, the position calculator 260 computes the position vector q (see FIG. 2). Then, the position calculator 260 outputs them.

Here, the method for computing the absolute position within the controlled area C of the mobile object D will be explained with reference to FIG. 12. In this FIG. 12, the controlled area C is denoted by plane coordinates α, the position vector of the robot R is denoted by X-Y coordinates p(x, y), and the position within a plane coordinates θ around the robot R of the mobile object D is denoted by s(r, θ).

In this case, the position vector q(X, Y) within a plane coordinates α of the mobile object D is shown as following formula (1).

$$q(X,Y)=(x+r\times\cos(\theta+\phi), y+r\times\sin(\theta+\phi)) \qquad (1)$$

Here, φ denotes the absolute angle with respect to the controlled area C of the robot R.

As can be seen from formula (1), the position vector q(X, Y) is shown by the position vector p(x, y) of the robot R, a distance r from the base point of this position vector p(x, y) to the mobile object D, and direction θ.

Thereby, since the robot R can move in the vicinity of the mobile object D, the position detection of the mobile object can be achieved without increasing the transmission power of the tag T, which is attached to the mobile object D, even if the range of the controlled area C is enlarged.

The data storage unit 230 stores the absolute position (position vector q) within the controlled area C of the mobile object D, attribute-information of the mobile object D obtained from the mobile object database 210, and time information therein. Here, the absolute position (position vector q), attribute-information, and time information are correlated one another.

The robot manager 270 controls the travel within the controlled area C of the robot R. To be more precise, the robot manager 270 generates the command signal (program) for traveling the robot R along the route of the travel of the robot R.

In this embodiment, the robot manager 270, prior to the selection of the route, refers to a map database 220 to obtain the data of obstacles within the controlled area C.

Then, the robot manager 270 determines the route of the robot R so that the travel of the robot R is not interrupted with obstacles within the controlled area C, and generates the command signal based on the route.

Here, the route of the robot R may be stored beforehand in the map database 220. In this case, the robot manager 270 selects the route of the robot R from among routes stored in the map database 220.

Additionally, the route of the robot R may be determined in consideration of the position vector q(X, Y) of the mobile object D so that the robot R follows the travel route of the mobile object.

Here, the command signal which commands the robot R to perform the predetermined motion when the specific mobile object D is detected can be adoptable, if a plurality of mobile objects is within the controlled area C.

<Processing in Position Detection System>

Next, the data processing performed in the position detection system A will be explained with reference to flow-charts of FIGS. 13 and 14.

MOTION EXAMPLE 1

The motion example of FIG. 13 is the case where the robot R collects information of the mobile object D, which was detected by the robot R during the travel within the controlled area C of the robot R, Here, the information which indicates when and where the mobile object D is in corresponds to the information of the mobile object D.

Firstly, the route of the robot R is established so that the robot R moves around the controlled area C, and a command signal (program) which commands the robot R to move around the route is entered in the management computer 3 (Step S11), and is transferred to the robot R (Step S12).

If a plurality of robots R (R1, R2, . . . ) are within the controlled area C, different programs are generated for each robot R and are transferred to the corresponding robot R (R1, R2, . . . ).

The robot R travels throughout the controlled area C in compliance with the program when the robot receives the program (Step S13). In this occasion, an infrared light signal B (light signal B) including the direction check signal H (Hc1, Hc2, . . . , Hc8) is irradiated from the light emission unit 100 (LED1-LED8) of the robot R (Step S14).

If the mobile object D is within the range wherein an infrared light signal B from the robot R can be received and the tag T provided on the mobile object D receives the infrared light signal B, the tag T detects one of the direction check signal H (Hc1, Hc2, . . . , Hc8). Then, direction information θ is obtained from the emitter ID included in the direction check signal H.

The tag T which has received direction information θ generates the receipt signal including the tag ID and the robot ID contained in the direction check signal H, and transmit it to the robot R (Step S17).

The robot R continues to moving in compliance with the program, when the robot R does not receive the receipt signal J transferred from the tag T (Step S18, No).

The robot R computes the distance r between the robot R and the mobile object D based on the intensity of the receipt signal J in addition to relative vector s (r, θ) (Step S19), when the robot R receives the receipt signal J.

Then, the robot position measurement unit obtains the robot position information [p (x, y), angleθ] by using the robot position measurement unit, and the robot R transmits the robot position information to the base station 1 together with the tag ID included in the receipt signal J and the relative vector s(r, θ) (Step S20).

The absolute position (position vector q(X, Y)) within the controlled area C of the mobile object D is computed based on the formula (1) (Step S22), when the information transferred from the robot R is received by the base station 1 (Step S21).

The absolute position within the controlled area C of the mobile object D, the attribute-information, e.g. person's name, of the mobile object D that are being correlated to the tag ID, and time information are stored as contents of data (Step S23). Thereby, information which indicates the presence within the controlled area C of the person and information, which indicates when and where the person was detected, are generated. Then, the robot R repeats the processing from Step 11 to Step 23 during the travel under the control of the program of the robot R (Step S24).

MOTION EXAMPLE 2

The motion example of FIG. 14 is the case where the robot R has detected the mobile object D within the controlled area C and makes a predetermined motion after approaching to the mobile object D.

Here, the motion for delivering the message to the mobile object D (person) or the motion for passing a baggage to the mobile object D (person) are the example of the predetermined motion.

Firstly, the mobile object D to be detected is determined in the base station 1 (Step S51). Then, the program which commands the robot R to search the mobile object D is transferred from the base station 1 (Step S52).

The robot R moves throughout the controlled area C in compliance with the program (Step S53) when the robot R has received the program.

In this occasion, the search signal F is repeatedly transferred at a fixed cycle from the radio transmitter-receiver 90 in the form of radio wave W (Step S54).

If the mobile object D with the tag T is within the region where the receipt of radio wave W is available, and the tag T has received radio wave W (Step S55), the tag T transmits the receipt signal J including the tag ID and the emission request signal to the robot R (Step S56).

Here, the robot R continues to travel in compliance with the program, if the robot R does not receive the receipt signal J including the tag ID and the emission request signal (Step S57, No), On the contrary, the distance r from the robot R to the tag T is computed, when the robot R has received the receipt signal J. Then, the distance r obtained by computing is compared with a threshold value (a).

When the distance r is smaller than the threshold value (a) (Step S58, Yes), the robot R transmits the tag ID obtained from the receipt signal J and the robot ID assigned to the robot R to the base station 1 (Step S59).

When the distance r exceeds the threshold value (a) (Step S58, No), the robot R continues to travel in compliance with the program.

Here, the threshold value (a) should be determined at distance wherein the infrared light B is surely received.

When the tag ID from the robot R is received by the base station 1 (Step S60), the object database 210 is searched based on the tag ID to identify the mobile object (person) which has transferred the receipt signal J including the tag ID. Thereby, the checking of whether or not the mobile object D (person) identified by the tag ID is the mobile object D to be detected is performed (Step S61).

If the mobile object D (person) identified by the tag ID is not the mobile object D to be detected (Step S62, No), the robot R continues to travel in compliance with the program (Step S52).

On the contrary, when the mobile object D (person) identified by the tag ID is the mobile object D to be detected (Step S62, Yes), the base station 1 commands the robot R to irradiate the infrared light signal B (light signal) including the direction check signal H(Hc1, Hc2, . . . , Hc8) (Step S63).

Thereby, the robot R irradiates the infrared light signal B to determine the position of the mobile object D. Here, the detailed processing of the determination of the position of the mobile object D is the same as that of steps from S63 to S71. Therefore, the explanation of them will be omitted.

The base station 1 transmits the command signal which commands the robot R to move to the position indicated by the position vector q(X, Y) (Step S72), when the position vector q(X, Y) of the mobile object D is computed (Step S71).

Thus, the robot R moves to the position in the vicinity of the mobile object D in compliance with the command signal (Step S73), and then the robot R performs the predetermined motion, e.g. the motion for delivering the message to the mobile object D (Step S74).

Then, the processing from steps S51 to S74 is repeated, if next mobile object D has already been determined (Step S75, No).

In the motion example 2, the detection of the mobile object D using radio wave w (Step S54-Step S59) and the determination of the position of the mobile object using an infrared light B (Step S63-Step S69) are separately performed. This is because the transparency due to reflection and diffraction of radio wave W is high and the detection error of the tag T is not likely to occur.

Therefore, in the present embodiment, in order to perform the position detection of the mobile object D speedy and accurately, the presence of the mobile object D is checked using radio wave W prior to the accurate position detection of the mobile object D using the light signal (infrared light B).

In the above described embodiment, the robot R which can perform the bipedal walking is used as an example of the detector. But, the detector is not limited to the robot as long as the detector can measure object position information s(r, θ) and robot position information [p(x, y), angle θ]. For example, a radio controlled car can be example of the detector.

In the above described embodiment, direction information θ among object position information s(r, θ) is computed using the emitter ID, and distance information r is computed based on field intensity of the receipt signal J which is transferred from the tag T. But, object position information s(r, θ) may be computed using an image obtained from cameras C of the robot R.

Second Embodiment

Next, a second embodiment of the position detection system A for the mobile object will be explained.

The position detection system A of this second embodiment has almost the same construction as the first embodiment, and the function of each component is almost the same as those of the first embodiment.

Therefore, the explanation of the position detection system A will be made for different parts mainly, and the explanation of other part will be made as appropriate.

[Controller 40]

Referring to FIG. 15, the controller 40 includes a personal identification unit 40a, a dialogue controller 40b, a motion judgment unit 40c, a route selector 40d, a map data selector 40e, a transportation controller 40f, a travel controller 40g, a personal information selector 40h, a specific information selector 40i, and a travel direction judgment unit 40j.

(Personal Identification Unit 40a)

The personal identification unit 40a performs a personal identification of the mobile object D (person) with the tag T based on the tag ID obtained from the receipt signal J transferred from the tag T. To be more precise, the personal identification unit 40a refers to the database (mobile object database 210), which is stored in the recording unit (not shown) of the management computer 3, based on the tag ID, and acquires personal information being correlated with the tag ID Thereby, the communication with a specific person is enabled based on personal information. In this embodiment, the tag ID of a specific person, person's name, age, gender, gusto, and schedule correspond to personal information.

In this embodiment, an input and update of personal information stored in the database (the mobile object database 210) is performed by the terminal 5 which is connected to the management computer by the network 4.

Here, personal information may be stored in a storage unit (not shown) installed in the robot R.

The personal identification unit 40a may perform the personal identification by the comparison between face information of a person (mobile object D) that is entered from the image processor 10 and face information, which is stored beforehand in the storage unit. In this case, since the personal identification of the mobile object (person) can be performed using face information and personal information, the accuracy of the personal identification can be improved.

(Dialogue Controller 40b)

The dialogue controller 40b generates voice data to be sounded through the speaker S, and supplies it to the voice processor 20. In this case, a synthetic voice is generated from voice data in the voice synthesizer 21a, and is sounded through the speaker S.

Here, text data of contents of the speech, which is entered from the voice processor 20, corresponds to voice data.

The dialogue controller 40b generates voice data for a response based on the semantic content of text data of contents of the speech.

(Motion Judgment Unit 40c)

The motion judgment unit 40c determines the motion, e.g. a travel and a speech, of the robot R, and outputs a command signal which commands each section of the robot R to perform the motion which was determined.

Here, the signal, which commands the autonomous travel controller 50 to move to the position of the tag T when the tag T is detected and the position of the tag T is measured, corresponds to the command signal.

(Route Selector 40d)

The route selector 40d superimposes the position measured by the object detection unit 70 on map data acquired by the map data selector 40e, and determines the destination of the robot R. Then, the route selector 40d selects the route to the destination from the current position of the robot R.

(Map Data Selector 40e)

The map data selector 40e acquires map information of the surrounding area of the robot R and map information of the route to the destination from the current position of the robot R. Here, this map information may be stored in the storage (not shown) of the management computer 3 (see FIG. 1).

(Transportation Controller 40f)

The transportation controller 40f controls the transportation of a baggage determined by the motion judgment unit 40c.

Here, a baggage pickup, a baggage transportation, and a baggage delivery correspond to the transportation of a baggage requested by a person through conversation.

(Travel Controller 40g)

The travel controller 40g controls the leg part R3 to travel the robot R. To be more precise, the travel controller 40g outputs a command signal to the autonomous travel controller 50 to control the leg part R3. In this occasion, the travel controller 40g also outputs a command signal which actuates the head part 51a and arm part 51b to control the displacement of the center of gravity.

(Personal Information Selector 40h)

The personal information selector 40h acquires personal information. The personal information selector 40h transmits the tag ID to the management computer 3 when the tag ID is obtained from the tag T. Thereby, in the management computer 3, the storage unit (not shown) of the management computer 3 is searched based on the tag ID to obtain personal information corresponding to the tag ID. Thus, the personal information selector 40h can acquire personal information.

(Specific Information Selector 40i)

The specific information selector 40i acquires specific information to be required for the specific motion of the robot R. In the present embodiment, for example, information to be required for a conversation with the person who was identified by personal information corresponds to the specific information. If the content of personal information relates to a schedule of the person, and the content indicating a golf course in Tochigi prefecture as schedule, weather information around the golf course is one example of the specific information.

(Travel Direction Judgment Unit 40j)

The travel direction judgment unit 40j measures the travel direction and travel distance of the tag T. Here, the travel direction and travel distance are obtained in consideration of the relation between the direction and distance at given time of the tag T detected by the object detection unit 70 and the direction and distance at the other given time of the tag T detected by the object detection unit 70.

In this embodiment, for example, the travel direction judgment unit 40j plots the position, which is identified based on the direction and distance of the tag T detected by the object detection unit 70, in x-y space. Here, in this x-y space, the front direction of the robot R is "+x-axial" direction and the right direction of the robot R is "+y-axial" direction.

Thereby, since two points are indicated on x-y space, the travel direction and distance can be measured. Thus, the timewise change of the travel direction and distance can be measured by the travel direction judgment unit 40j based on information indicating direction and distance of the mobile object D which are entered from the object detection unit 70 at real time. This enables to control the travel to the mobile object D of the robot R.

[Management Computer 3]

FIG. 16 is a block diagram showing the construction of the management computer 3.

The management computer 3 includes a communication unit 3a, a control unit 3b, a specific information acquisition unit 3c, a map database 3d, a database manager 3e, a specific information database 3f, and a personal information database 3g.

The communication unit 3a establishes a communication between the management computer 3 and the robot R through the base station 1 (see FIG. 1). The control unit 3b controls the data processing in the management computer 3.

(Specific Information Acquisition Unit 3c)

The specific information acquisition unit 3c plays the same role as the specific information selector 40i of the controller 40 of the robot R, and acquires the specific information.

The specific information acquisition unit 3c searches the specific information database 3f based on personal information, which is obtained based on the tag ID from the personal information database 3g when the tag ID is transmitted from the robot R, and obtains specific information.

(Map Database)

The map database 3d stores map data therein. The database manager 3e manages the map database 3d, the specific information database 3f, and the personal information database 3g, and controls the input/output of data to respective databases.

(Specific Information Database)

The specific information database 3f stores specific information therein. In this embodiment, it is preferable that the update of specific information is performed at a predetermined cycle under the control of the control unit 3b by acquiring the contents of specific information from other computers, which are connected to the management computer 3 through the network 4. Here, the information with regard to community events and weather corresponds to specific information.

(Personal Information Database)

The personal information database 3g stores personal information therein. In this embodiment, since personal information in database is being correlated with the tag ID, the search of personal information is performed using the tag ID. But, the search of personal information may be performed using a serial number or a part of personal information, such as a name and an address, instead of the tag ID.

Next, signal processing in the position detection system A of the present embodiment will be explained using the block diagram of FIG. 4 and flow charts of FIGS. 17 to 19.

(Signal Processing in the Object Detection Unit 70)

The signal processing of object detection unit 70 of the robot R will be explained with reference to FIG. 17.

The signal generator 81a of the unit controller 80 refers, at a predetermined cycle, to the recording unit 110, and obtains the unique identification number of the robot R, to which the object detection unit 70 is being provided (Step S101). That is, the signal generator 81a obtains the robot ID from the recording unit 110.

Then, the signal generator 81a generates the search signal F which includes the robot ID and receipt request signal (Step S102). Additionally, the signal generator 81a generates the direction check signal H, which is irradiated as an infrared light signal from each light emitter of the light emission unit 100, for respective light emitters (Step S103). Here, the direction check signal H includes the robot ID obtained in step S101 and the emitter ID to be used for identifying the light emitter which emits the direction check signal H.

The encryption unit 82 of the unit controller 80 encrypts the search signal F to generate the encrypted search signal Fc, and outputs the encrypted search signal Fc to the radio transmitter-receiver 90. Thus, the encrypted search signal Fc is modulated by a predetermined modulation scheme to generate the modulated signal. Then, the modulated signal is transferred through the transceiver antenna 93 (Step S104). That is, the search signal is transferred by wireless.

The encryption unit 82 of the unit controller 80 encrypts the direction check signal H generated in the signal generator 81a to generate the encrypted direction check signal Hc, and then outputs the encrypted direction check signal Hc to the time division unit 83.

The time division unit 83 determines the irradiation order and timing of each light emitter (LED 1-LED 8) of the light emission unit 100 (Step S105), when the encrypted direction check signal Hc is entered from the encryption unit 82. Then, the time division unit 83 outputs the encrypted direction check signal Hc to the modulator of corresponding light emitter (LED 1-LED 8) based on the determined timing (Step S106).

The modulator of each light emitter of the light emission unit 100 modulates the encrypted direction check signal Hc by a predetermined modulation manner to obtain the infrared light signal of a predetermined wave length. Then, the infrared light signal is irradiated to the search region from the light emitter adjoining to the modulator (Step S107).

Thereby, an infrared light is irradiated toward each search region established around the robot R by the determined order and timing.

The tag T generates the receipt signal J (modulated signal) and transmits it by wireless, when the tag T receives the search signal F (modulated signal) transmitted from the transceiver antenna 93 of the radio transmitter-receiver 90.

The demodulator 92 obtains the encrypted receipt signal Jc by demodulating the modulated signal, when the demodulator 92 receives the modulated signal (receipt signal J) transferred from the tag T (Step S108, Yes). The demodulator 92 outputs the encrypted receipt signal Jc to the decoder 84 and field intensity measuring unit 85 of the unit controller 80.

The decoder 84 of the unit controller 80 decodes the encrypted receipt signal Jc to obtain the receipt signal J, and outputs the receipt signal J to the data processor 81.

The field intensity-measuring-unit 85 of the unit controller 80 detects a power of the encrypted receipt signal Jc, which is entered from the demodulator 92 of the radio transmitter-receiver 90, and computes an average of the detected power. Then, the field intensity measuring unit 85 outputs the computed average value to the data processor 81 as the data of the field intensity.

The position computing part 81b refers to the distance table based on the field intensity entered from the field intensity measuring unit 85, and obtains information (area information) which indicates which area among areas (from first area to fourth area) the tag T that has transmitted the receipt signal J exists in (Step S109). That is, the position computing part 81b measures the distance from the robot R to the tag T based on the intensity of the field intensity.

The position computing part 81b refers to the direction table stored in the recording unit 110 based on the emitter ID, which is included in the receipt signal J entered from the decoder 84. Then, the position computing part 81b obtains the information (direction information) which identifies the light emitter which has irradiated an infrared light received by the tag T.

Then, the position computing part 81b generates the position information which indicates the position of the mobile object D from area information and direction information (Step S110). Thus, the position of the mobile object D is determined.

If the receipt signal J (modulated signal) transferred from the tag T has not been received by the demodulator 92 of the radio transmitter-receiver 90 (Step S108, No), the demodulator 92 keeps the standby condition till the receipt signal J (modulated signal) is received.

(Signal Processing in Tag T)

Next, the signal processing to be performed in tag T which serves as the mobile object D will be made with reference to the block diagram of FIG. 9 and the flow chart of FIG. 18.

When radio wave (modulated signal) transferred from the robot R has been received through the antenna 141 (Step S120, Yes), the demodulator 142 of the radio transceiver 140 demodulates the modulated signal to obtain the encrypted search signal Fc. Then, the demodulator 142 outputs the encrypted search signal Fc to the receipt signal generator 160.

The decoder unit 161 of the receipt signal generator 160 decodes the encrypted search signal Fc entered from the radio transceiver 140 to obtain the search signal F. Then, the decoder unit 161 outputs the search signal F to the processor unit 162.

The processor unit 162 of the receipt signal generator 160 changes the condition of the light receiver 150 from a standby condition to an activated condition in response to the receipt request signal included in the search signal F (Step S21).

When the optical receiver 151 of the light receiver 150 receives the infrared light signal irradiated from the robot R within a predetermined time after activating the light receiver 150 (Step S122, Yes), the light demodulator 152 of the light receiver 150 demodulates the infrared light signal to obtain the encrypted direction check signal Hc. Then, the light demodulator 152 outputs the encrypted direction check signal Hc to the receipt signal generator 160.

Thus, the decoder unit 161 of the receipt signal generator 160, to obtain the direction check signal H, decodes the encrypted direction check signal Hc and outputs the direction check signal H to the processor unit 162.

The processor unit 162 of the receipt signal generator 160 compares the robot ID included in the direction check signal H with the robot ID included in the search signal F.

If both robot IDs agree each other (Step S23), the processor unit 162 generates the receipt signal J. Prior to the generation of the receipt signal J, the processor unit 162 refers to the storage 170 and obtains a unique identification number (tag ID) assigned to the tag T.

Then, the processor unit 162 generates the receipt signal J which includes the tag ID, the robot ID included in the search signal F, and the emitter ID included in the direction check signal H, and the processor unit 162 outputs the generated receipt signal J to the encryption unit 163 (Step S124).

Here, the processor unit 162 generates the receipt signal J which further includes the emission request signal therein, if the direction check signal H is not entered within a predetermined time after activating the light receiver 150 (Step S122, No) or if the robot ID of the direction check signal H disagrees with the robot ID of the search signal F (Step S123, No). Then, the processor unit 162 outputs the generated receipt signal to the encryption unit 163 (Step S125).

The modulator 143 of the radio transceiver 140, to obtain the modulated signal, modulates the encrypted receipt signal Jc entered from the encryption unit 163, and then transmits the modulated signal by wireless through the antenna 141 (Step S126).

(The Processing in the Position Detection System A)

Next, the processing in the position detection system A, which is adapted to the detection of the visitor of the office, will be explained with reference to the block diagrams of FIGS. 1 to 4, 10, and 19.

A visitor of the office, for example, receives the tag T at the reception desk, and information, e.g. a name of the visitor and visiting section, is inputted through the terminal 5 disposed on the reception desk (Step S150).

Thus, information entered from the terminal 5 is stored in the recording unit (not shown) of the management computer 3 which connects with the terminal 5 through the network 4 (Step S151).

Then, the visitor attached the tag at the reception desk and begins to travel to the visiting section.

The controller 40 of the object detection unit 70 generates the search signal F and direction check signal H at a fixed cycle (Step S152), and the search signal F is transferred by wireless from the radio transmitter-receiver 90 (Step S153).

The direction check signal H is modulated in the light emission unit 100, and then the modulated signal is irradiated, as an infrared light signal, to the predetermined search region (Step S154).

When the tag T receives the direction check signal H in addition to the search signal F (Step S155, Yes), the receipt signal J is generated (Step S156), and then the receipt signal J is transferred by wireless (Step S157)

When the unit controller 80 receives the receipt signal J transferred by wireless from the tag T, the unit controller 80 computes the distance from the robot R to the mobile object D based on the field intensity of the receipt signal J (Step S158). The unit controller 80 identifies the light emitter which has irradiated the light signal received by the tag T. Then, the unit controller 80 regards the irradiation direction of the identified light emitter, as the direction of the mobile object D (Step S159). Thereby, the position of the mobile object D is determined (Step S160).

The unit controller 80 of the object detection unit 70 outputs the position information and tag ID, which is obtained from the receipt signal J, to the controller 40 of the robot R.

The controller 40 of the robot R transmits the tag ID to the management computer 3 together with the position information (Step S161). In the management computer 3, the identification (reorganization) of the mobile object D (person) equipped with the tag T, to which tag ID is assigned, is performed, by searching the recording unit (not shown) based on the tag ID (Step S162). Then, the information (personal information) with regard to the identified mobile object D (person) is transferred to the robot R together with the command signal to be required for actuating the robot R (Step S163).

Then, the robot R performs the motion (travel) and sounds the voice message, based on the command signal entered from the management computer 3.

In the present invention, for example, the robot R performs the following motions etc. 1) the robot R moves to the front position of the mobile object D (person) having the tag T, and performs the image pickup of the face image of the mobile object D, 2) the robot R sounds a voice message such as "GOOD MORNING Mr.", and 3) the robot R sends a predetermined message to the mobile object D (person).

<Motion of Robot with Interaction>

Next, the motion (motion pattern 1 to motion pattern 3) with interaction in conversation of the robot R will be explained.

In the following explanation the motion of the robot R will be explained under the assumption that the robot is disposed in an office. But, the robot R may be disposed in a hospital or a city government instead of a company office, and may be disposed inside or outside of building. Additionally, the area where the robot moves around is not limited to a specific area as long as the robot R can obtain map data and can travel based on map data.

(Motion Pattern 1)

The motion pattern 1 with interaction in conversation of the robot R will be explained with reference to FIGS. 20 and 21.

Here, the motion pattern 1 is the case where the robot R accepts a baggage X from the person D1 and conveys the baggage X to the person D2, while having a conversation with the person D1 or D2 and while conducting the motion to be required as a result of the conversation.

When the robot R is called by the person D1 (Step S200) a voice of the person D1 is collected by the microphone MC and is supplied to the voice recognizer 21b of the voice processor 20.

The voice recognizer 21b converts voice data into text data with reference to dictionaries, and outputs the text data to the dialogue controller 40b of the controller 40 (See FIG. 15) Then, the dialogue controller 40b generates a command signal which commands the robot R to conduct a predetermined motion and conversation in compliance with text data.

In this embodiment, since it turns out that the person D1 has requested the robot R to carry a baggage, a signal which indicates that the robot R has accepted a baggage carriage is generated and is supplied to the motion judgment unit 40c.

Then, the motion judgment unit 40c performs predetermined processing (see FIG. 17) to determine the position of the person D1 who has requested the robot R to carry a baggage. Thus, the motion judgment unit 40c generates a command signal which commands the robot R to move to the position determined of the person D1, and outputs it to the travel controller 40g.

Then, the robot R sounds a voice message for a baggage carriage, e.g. "I will deliver your baggage to D2" (step S202) and makes a motion for receiving the baggage (Step S203).

Next, the map data selector 40e of the controller 40 requests the management computer 3 to send map data to be required for traveling to the desk of the person D2 from the current position (the desk of the person D1) of the robot R. In the management computer 3, the database manager 3e searches the map database 3d to obtain map data, and transmits map data, which was obtained, to the robot R through the communication unit 3a.

Thereby, the robot R selects the route to the desk of the person D2, to whom the baggage is delivered, from the current position of the robot R based on map data (Step S204).

Next, the motion judgment unit 40c generates a command signal which commands the robot R to travel along the route selected in Step S204, and transmits it to the autonomous travel controller 50. Thereby, the robot travels along the route selected in Step S204 in compliance with the command signal (Step S205).

The robot T repeats the checking of whether or not the mobile object D with the tag T exists within the surrounding area, during the travel on the selected route. In this occasion, the robot R performs the personal identification to search the person D2 to whom the baggage is delivered, if the mobile object is detected within the surrounding area (Step S206).

If the person D2 is detected (Step S207, Yes), the robot R irradiates an infrared light signal in compliance with the manner described before, and determines the position of the person D2.

When the infrared light signal is received by the tag T of the person D2, the receipt signal is transferred to the robot R from the tag T. Thereby, in the robot R, the checking of whether or not the infrared light received by the tag T is a direct light or a reflected light is performed by checking the light condition data included in the receipt signal (Step S210).

In this embodiment, the checking of whether or not the infrared light is a direct light or a reflected light is determined based on the brightness of the infrared light received by the light receiver 150, and the receipt signal generator 160 of the tag T generates the receipt signal J including a light condition data which indicates that the result of the checking. Therefore, the motion judgment unit 40c of the robot R can determine the light condition based on the light condition data included in the receipt signal.

When the light received by the tag T is a direct light (Step S210, Yes), the processing in the robot R proceeds to step S215.

On the contrary, the light received by the tag T is a reflected light (Step S210, No), the motion judgment unit 40c of the robot R actuates the head part R1 to make a motion such as looking around restlessly for searching a person (Step S211) Thereby, the person around the robot R is notified that the robot R is searching for a person.

Additionally, the motion judgment unit 40c controls the voice processing in the dialogue controller 40b in order to sound a voice message, such as "Is Mr. D2 there?" (Step S212).

The object detection unit 70 again checks whether or not the tag T of the person D2 is detected (Step s213), and checks whether or not the person D2 is in front of the robot R (Step S214) if detected (Step S213, Yes).

If the person D2 is in front of the robot R (Step S214, Yes), the head part R1 of the robot R is directed to the person D2 (Step S215) and sounds the voice message, e.g. "I have a baggage for Mr. D2" (Step S216). Then, the robot R passes the baggage to the person D2 (Step S217).

On the contrary, when the robot R arrives at the desk of the person D2 without detecting the existence of the person D2 (Step S207, No), robot R again performs the checking of whether or not the person D2 is detected around the desk of the person D2 (Step S208). The robot R puts the baggage on the desk of the person D2 if the person D2 is not detected (Step S209).

(Motion Pattern 2)

The motion pattern 2 with interaction in conversation of the robot R will be explained with reference to FIGS. 22 through 25.

The motion pattern 2 is the same as the motion pattern 1 except that the robot R, which is traveling to carry a baggage X from the person D3 to the person D4, encounters the person D5 before arriving at the desk of the person D4. Therefore, in the following explanation, only the different processing from the motion pattern 1 will be explained.

Referring to FIG. 22, when the robot R has detected the person D5, e.g. executive directors, before arriving at the desk of the person D4, (Step S318, Yes), the robot R performs the subroutine of Step S400.

Here, the subroutine of Step S400 will be explained with reference to FIG. 23. The robot R turns the body of the robot R to direct the front side of the robot R to the person D5 in compliance with the command signal entered from the motion judgment unit 40c (Step S400). Then, the robot R sounds the voice message "Good afternoon Mr. D5" (Step S401), and the robot gives the person D5 a nod by actuating the head part R1 etc. of the robot R (Step S402). Then, the robot R again starts the travel to the desk of the person D4 (see FIG. 22) (Step S305).

When the robot R has detected the person D3, who has requested the robot R to deliver the baggage C to the person D4, before arriving at the desk of the person D4, the robot R performs the subroutine of Step S500.

Here, the subroutine of Step S410 will be explained with reference to FIG. 24.

The robot R turns the body of the robot R to direct the front side of the robot R to the person D3 in compliance with the command signal entered from the motion judgment unit 40c (Step S501).

The robot R checks whether or not the delivery to the person D4 of the baggage X has already been completed (Step S502). If completed, the robot R checks whether or not the baggage X was directly passed to the person D4 (Step S503). If so (Step S503, Yes), the robot R sounds the voice message which notify the person D3 that the baggage X was directly passed to the person D4 (Step S504).

If the baggage X was left on the desk of the person D4 (Step S505, Yes), the robot sounds the voice message which notify the person D3 that the baggage X was left on the desk of the person D4 (Step S506).

If the baggage X was left to the other person, the robot sounds the voice messages which notify the person D3 that the baggage X was left to the other person (Step S507).

If the delivery of the baggage X has not been completed (Step S502, No) and the baggage X is still on the robot R (Step S502, No), the robot R sounds the voice message which notify the person D3 that the robot wants to return the baggage X to the person D4 (Step S509).

Here, if the robot R has already returned the baggage X to the desk of the person D3, the robot sounds the messages which notify the person D3 that the baggage X has already returned the baggage X to the desk of the person D3.

(Motion Pattern 3)

The motion pattern 3 with interaction in conversation of the robot R will be explained with reference to FIG. 26.

Here, the motion pattern 3 is the case where the robot R performs the personal identification and the motion to have a communication with the person, when the robot R has detected the person.

Firstly, when the robot R has detected the tag T (Step S601, Yes) during the checking of the existence of the tag T (Step S600), the robot R refers to the recording unit (not shown) of the management computer 3 based on the tag ID included in the receipt signal from the tag T, in order to perform the personal identification of the person having the tag T which has transmitted the receipt signal (Step S602).

When the person who was detected is the person D6, the robot R obtains personal information of the person D6 from the personal information database 3g in the recording unit (not shown), in order to check the schedule of the person D6.

For example, if the schedule, which indicates that the person D6 is scheduled to leave for Tochigi as a working visit, is obtained (Step S604), the robot R obtains information with regard to Tochigi from the network 4 (Step S605).

For example, if the weather forecast of the Tochigi is "rain" and there is a trouble in a transport facility for Tochigi (Step S606), the robot makes the motion to go get an umbrella (Step S607) or the motion for searching an alternative transportation means (Step S608). Then, the robot R takes the motion for delivering the umbrella to the person D6 (Steps S609-S617).

For example, if the robot takes the motion for delivering the umbrella to the person D6 (Step S616), the robot R sounds the voice message "Carry your umbrella with you because Tochigi is rain" (See FIG. 25).

Although there have been disclosed what are the patent embodiments of the invention, it will be understood by person skilled in the art that variations and modifications may be made thereto without departing from the scope of the invention, which is indicated by the appended claims.

According to the mobile robot of the present invention, since the positional relation between the robot and mobile object can be measured, the mobile robot can be applied to various kinds of mobile objects in addition to a vehicle. For example the mobile robot of the present invention can be applied to a traffic control system. Additionally, various types of motion patterns are adoptable as the motion pattern of the present invention and the types of the motion pattern may be selected in consideration of the motion.

What is claimed is:

1. A position detection system for measuring a position of a mobile object traveling throughout a controlled area comprising:

a tag provided on the mobile object;

a mobile detector obtaining object position information which indicates the position of the mobile object, object position information includes direction information and distance information relative to the mobile detector of the mobile object, and the mobile detector travels throughout the controlled area;

a base station obtaining detector position information which indicates the position of the mobile detector, detector position information includes an absolute position and angle within the controlled area of the mobile detector, wherein the position within the controlled area of the mobile object is measured based on object position information and detector position information.

2. A position detection system according to claim 1, wherein the tag transmits a receipt signal to be received by the mobile detector, when a light signal of predetermined wavelength that is irradiated from the mobile detector is received.

3. A position detection system according to claim 2, wherein the tag transmits a receipt signal when the radio wave of predetermined frequency is received.

4. A position detection system according to claim 2, wherein the tag transmits the receipt signal further including a tag ID which is a unique identification number assigned to the tag.

5. A position detection system according to claim 2, wherein the mobile detector further comprising:

a light emitter emitting light signals, which include direction information, in radial direction; and a radio wave receiver which receives the receipt signal, wherein the tag transmits the receipt signal, which includes direction information being included in the light signal, when the tag receives the light signal, and field intensity of the receipt signal received by the radio wave receiver is used as distance information.

6. A position detection system according to claim 4, wherein the mobile detector further comprising:

a light emitter emitting light signals, which include direction information, in radial direction; and a radio wave receiver receiving the receipt signal, wherein the tag transmits the receipt signal, which includes direction information being included in the light signal, when the tag receives the light signal, and field intensity of the receipt signal received by the radio wave receiver is used as distance information.

7. A position detection system according to claim 6 wherein the light emitter emits the light signal further including a unique identification number assigned to the mobile detector, and the unique identification number of the mobile detector is added to the receipt signal and is transferred from the tag.

8. A position detection system according to claim 3, wherein the mobile detector transmits radio wave of predetermined wavelength.

9. A position detection system according to claim 3, wherein the base station comprising:

a detector controller controlling the mobile detector which travels throughout the controlled area; and an object position computing unit receiving object position information and detector position information which are transferred from the mobile detector, and measuring an absolute position within the controlled area of the mobile object.

10. A position detection system according to claim 6, wherein the base station comprising:
a detector controller controlling the mobile detector which travels throughout the controlled area; and
an object position computing unit receiving object position information and detector position information which are transferred from the mobile detector, and measuring an absolute position within the controlled area of the mobile object.

11. A position detection system according to claim 5, wherein the base station comprising:
a detector controller controlling the mobile detector which travels throughout the controlled area; and
an object position computing unit receiving object position information and detector position information which are transferred from the mobile detector, and measuring an absolute position within the controlled area of the mobile object.

12. A position detection system according to claim 10, wherein the base station further comprising:
an ID identification unit performing an identification of the mobile object, by referring to a database based on the tag ID from the mobile detector.

13. A position detection system according to claim 2, wherein the mobile detector is an autonomous bipedal walking robot.

14. A position detection system according to claim 13, wherein the mobile detector further comprising:
a position identification unit identifying the position of the mobile object based on object position information and detector position information; and
a travel controller controlling the travel of the mobile detector to the position identified by the position identification unit.

15. A position detection system according to claim 14, wherein the mobile object is a person with the tag, and
the mobile detector further comprising:
a dialogue controller controlling a dialogue with the person.

16. A position detection system according to claim 15, wherein the mobile detector further comprising:
a personal information acquisition unit obtaining a personal information correlated with the tag ID included in the receipt signal;
a motion determination unit determining a dialogue with the person or a motion of the mobile object, based on the personal information.

* * * * *